US012700721B2

(12) United States Patent
Maddox et al.

(10) Patent No.: US 12,700,721 B2
(45) Date of Patent: Aug. 4, 2026

(54) ELECTRICAL RECEPTACLE, MODULAR ELECTRICAL ASSEMBLY, AND METHODS

(71) Applicant: James Maddox, Greenville, IN (US)

(72) Inventors: James Maddox, Greenville, IN (US); Brian Pate, Fredericksburg, IN (US)

(73) Assignee: James Maddox, Greenville, IN (US)

( * ) Notice: Subject to any disclaimer, the term of this patent is extended or adjusted under 35 U.S.C. 154(b) by 241 days.

(21) Appl. No.: 18/795,934

(22) Filed: Aug. 6, 2024

(65) Prior Publication Data

US 2025/0055269 A1      Feb. 13, 2025

Related U.S. Application Data

(60) Provisional application No. 63/518,017, filed on Aug. 7, 2023.

(51) Int. Cl.
*H02G 3/16*          (2006.01)

(52) U.S. Cl.
CPC ...................................... *H02G 3/16* (2013.01)

(58) Field of Classification Search
CPC ....................................................... H02G 3/16
See application file for complete search history.

(56) References Cited

U.S. PATENT DOCUMENTS 6,361,333 B1 *    3/2002    Cash, Jr. .................. H02G 3/00
                                                                439/106
11,070,040 B1 *   7/2021    Garrasi ................ H01R 13/665

2010/0186982 A1 *   7/2010    Gates ..................... H01R 31/06
                                                                174/50
2017/0318691 A1 *   11/2017   Gates .................... H02G 3/081
2018/0375313 A1     12/2018   Misener et al.
2021/0104855 A1     4/2021    Bayard et al.

FOREIGN PATENT DOCUMENTS

KR      10-2010-0054495 A      5/2010
KR      20-2013-0002744 U      5/2013

OTHER PUBLICATIONS

Korean Intellectual Property Office, International Search Report and Written Opinion issued in corresponding Application No. PCT/US2024/041107, mailed Nov. 13, 2024.

* cited by examiner

*Primary Examiner* — Sherman Ng
(74) *Attorney, Agent, or Firm* — Stites & Harbison, PLLC; David W. Nagle, Jr.; Gary N. Stewart

(57)                    ABSTRACT

A receptacle for electrically connecting a circuitry of a building to module for transmitting and/or regulating a flow of electricity includes: a body which defines a cavity for receiving the module; and two or more electrical contacts secured to a surface of the body. Each electrical contact includes a terminal configured to place the receptacle in electrical connection with the module and a terminal configured to place the receptacle in electrical connection with the circuitry of the building or another receptacle. An assembly for transmitting and/or regulating a flow of electricity received from a circuitry of a building includes: the receptacle; and a module configured to transmit and/or regulate a flow of electricity received from the receptacle removably inserted in the cavity of the receptacle. Methods for replacing an electrical module of the assembly and installing the assembly are also disclosed.

18 Claims, 21 Drawing Sheets

ELECTRICAL RECEPTACLE, MODULAR ELECTRICAL ASSEMBLY, AND METHODS

CROSS-REFERENCE TO RELATED APPLICATION

The present application claims priority to U.S. Patent Application Ser. No. 63/518,017 filed on Aug. 7, 2023, the entire disclosure of which is incorporated herein by reference.

BACKGROUND OF THE INVENTION

The present disclosure relates to electrical receptacles and modular electrical assemblies for transmitting and/or regulating a flow of electricity received from a circuitry of a building.

Electrical boxes, also sometimes referred to as "junction boxes," are receptacles which are used to enclose wire connections and often serve as a mounting bracket for electrical modules, such as electrical outlets or switches, which facilitate the transmission and/or regulate the flow of electricity provided by circuitry of a house or other building. In this regard, wiring from the circuitry is typically passed into an interior of the electrical boxes and directly wired to the electrical transmittal and/or regulation unit mounted to the electrical box. Accordingly, in instances where an electrical module associated with the electrical box needs replaced or it is otherwise desired to switch from one type of electrical unit (e.g., a toggle switch) to another (e.g., a rotary switch), it is generally necessary to: turn off the power to the installed electrical unit; remove the electrical unit from the electrical box; disconnect the wiring from the circuitry from the electrical unit; connect the wiring from the circuitry to the replacement electrical unit; and then install the newly wired electrical unit to the electrical box.

Accordingly, novel receptacles, assemblies, and methods which facilitate simpler removal and installation of electrical transmittal and/or regulation units in an electrical box would be both beneficial and desirable.

SUMMARY OF THE INVENTION

The present disclosure includes a receptacle for electrically connecting a circuitry of a building to a module for transmitting and/or regulating a flow of electricity.

An exemplary receptacle made in accordance with the present disclosure includes: a body which defines a cavity for receiving the module; and two or more electrical contacts through which the flow of electricity can travel secured to a surface of the body. Each electrical contact of the receptacle includes a first terminal which can be utilized to place the receptacle in electrical connection with a terminal of the module, and a second terminal which can be utilized to place the receptacle in electrical connection with the circuitry of the building or another receptacle of like construction. To provide access to the electrical contacts from the cavity, the body defines a plurality of openings, with each respective opening aligning with the first terminal of one of the electrical contacts of the receptacle. In use, the receptacle can be wired to the circuitry of the building and act as an electrical interface between the electrical circuitry and the module.

The present disclosure also includes an assembly for transmitting and/or regulating a flow of electricity received from a circuitry of a building.

An exemplary assembly made in accordance with the present disclosure includes: a receptacle which includes a cavity and is configured to receive and transmit the flow of electricity from the circuitry of the building; and a module removably inserted into the cavity of the receptacle and configured to transmit and/or regulate the flow of electricity received from the receptacle. In use, the receptacle can be wired to the circuitry of the building and act as an electrical interface between the electrical circuitry and the module so that the module can be replaced with another module configured for insertion into the cavity of the receptacle without a user having to engage the circuitry of the building.

In some embodiments, the module includes a first terminal, a second terminal, an internal circuitry that is electrically connected to the first terminal and the second terminal. In some embodiments, the receptacle of the assembly includes a first electrical contact and a second electrical contact. The first electrical contact and the second electrical contact of the receptacle each include a first terminal that can be utilized to place the receptacle in electrical connection with a terminal of the module and a second terminal that can be utilized to place the receptacle in electrical connection with the circuitry of the building. In some embodiments, the electrical contacts of the receptacle are secured to a body of the receptacle that defines the cavity, a first opening providing access to the first terminal of the first electrical contact and into which one of the terminals of the module can be inserted through, and a second opening providing access to the first terminal of the second electrical contact, and into which another one of the terminals of the module can be inserted through.

In some embodiments, the assembly further includes an additional receptacle that is attached to the above-referenced receptacle of the assembly and includes a cavity, a first electrical contact, and a second electrical contact. In some embodiments, the assembly further includes an additional module configured to transmit and/or regulate the flow of electricity from the additional receptacle. In some embodiments, each module of the assembly is an electrical switch or an electrical outlet for transmitting the flow of electricity to another device electrically connected to the electrical outlet.

Methods for replacing an electrical module for transmitting and/or regulating a flow of electricity and installing an assembly for transmitting and/or regulating a flow of electricity received from a circuitry of a building are also provided.

DETAILED DESCRIPTION OF THE INVENTION

The present disclosure includes receptacles for electrically connecting a circuitry of a building to modules for transmitting and/or regulating a flow of electricity, assemblies for transmitting and/or regulating a flow of electricity received from a circuitry of a building, methods for replacing an electrical module for transmitting or regulating a flow of electricity, and methods for installing an assembly made in accordance with the present disclosure.

Figure 1:
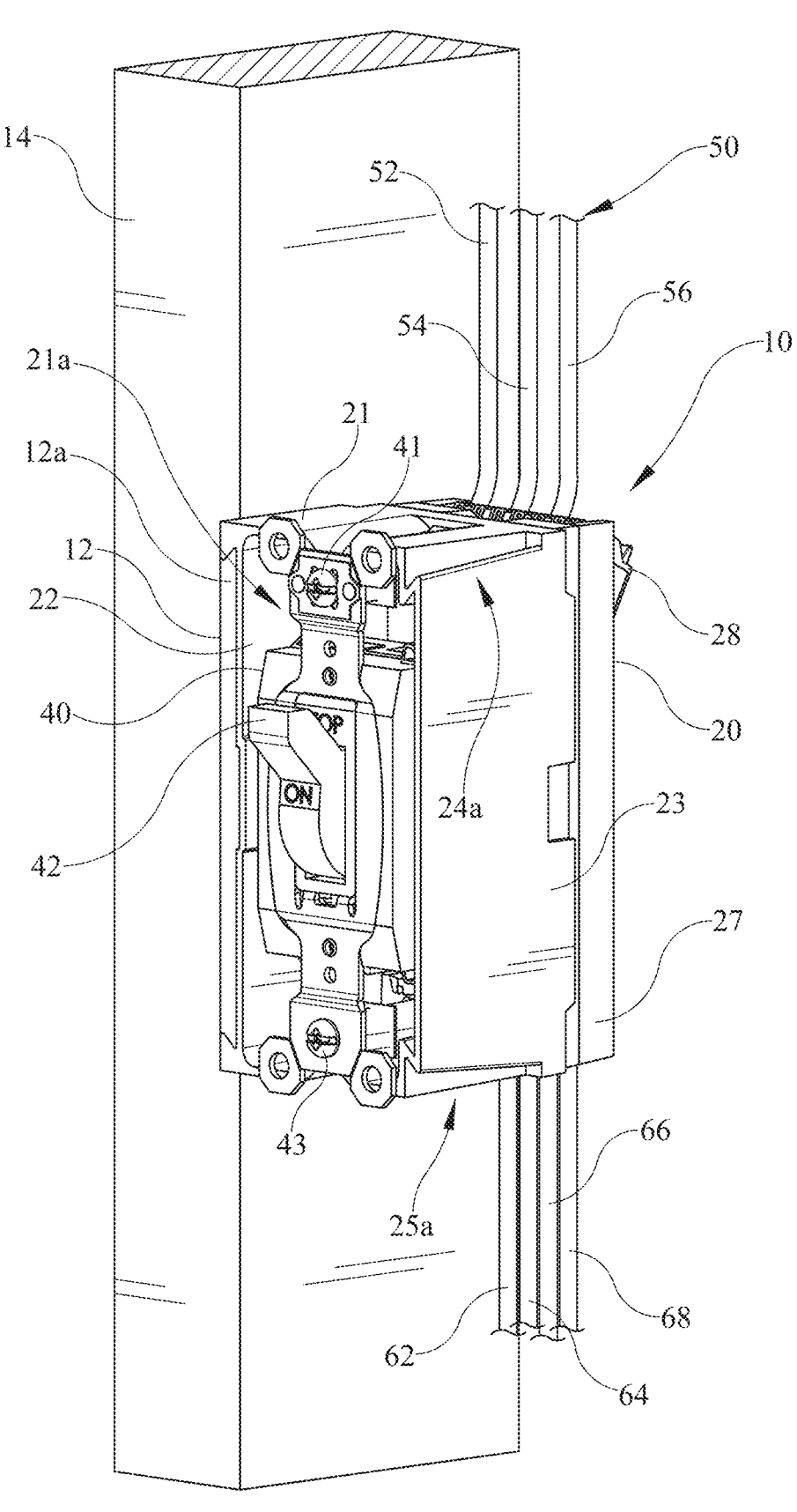
FIG. 1 is a perspective view of an exemplary assembly for transmitting and/or regulating a flow of electricity from a circuitry of a building (or assembly) made in accordance with the present disclosure mounted to a structure of the building.
Figure 2:
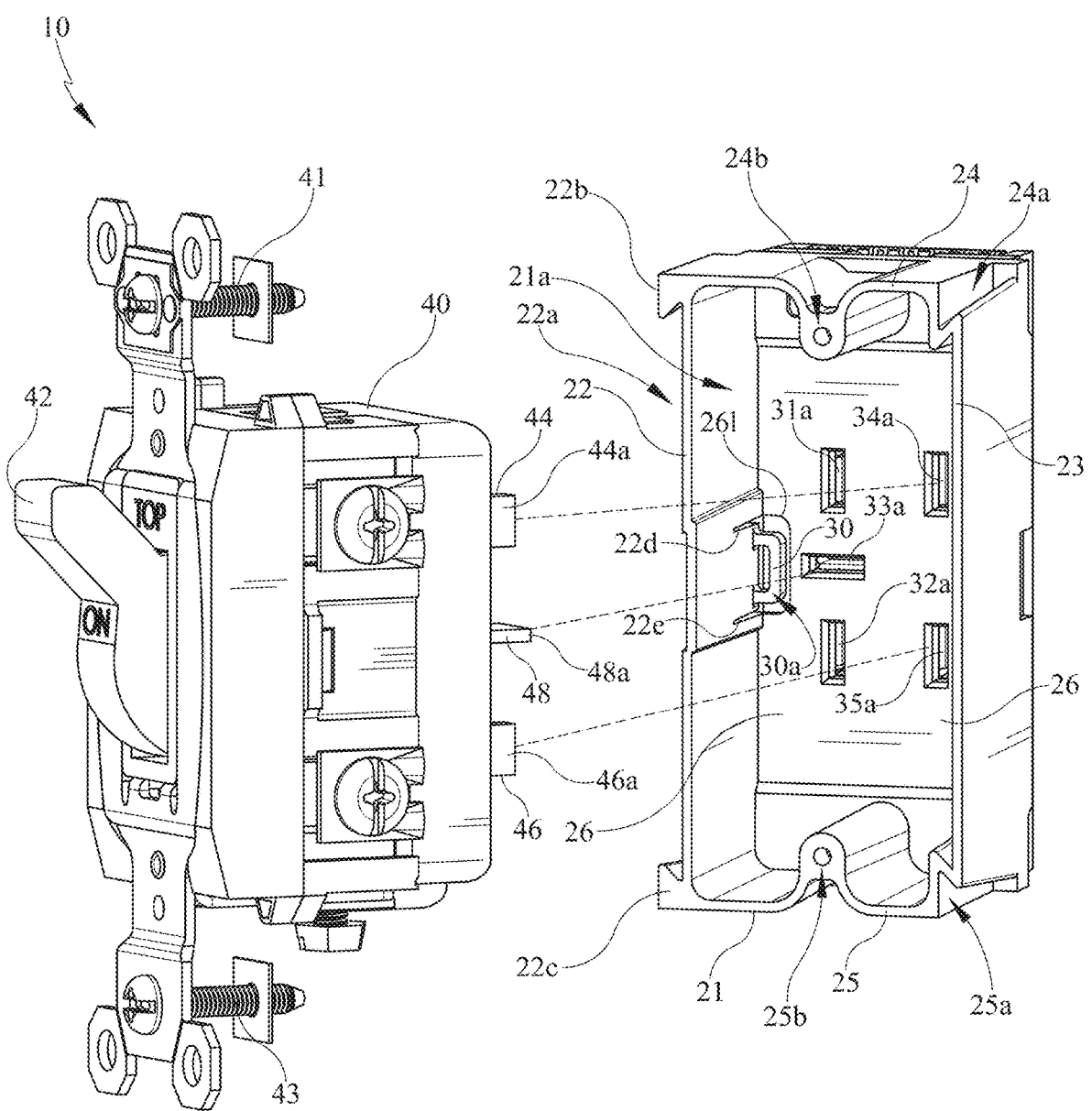
FIG. 2 is a partial exploded view of the exemplary assembly of FIG. 1.

Referring first to FIGS. 1 and 2, an exemplary assembly for transmitting and/or regulating a flow of electricity received from a circuitry of a building (or assembly 10) made in accordance with the present disclosure includes: an exemplary receptacle 20 configured to be electrically connected to, and receive a flow of electricity from, a circuitry 50 of the building, which, in this implementation, includes three wires 52, 54, 56; and an exemplary module 40 that is removably inserted in a cavity 21a of the receptacle 20. When the module 40 is inserted in the cavity 21a of the receptacle 20 and the receptacle 20 is electrically connected to the circuitry 50 of the building, a flow of electricity from the circuitry 50 received by the receptacle 20 is subsequently transmitted to the module 40, which regulates and/or further transmits the flow of electricity received from the receptacle 20. In this exemplary embodiment, the module 40 is in the form of an electrical switch that can be selectively manipulated to regulate a flow of electricity through the switch. However, as will become evident by the discussion that follows, depending on the application for which the assembly 10 is being utilized, the module 40 can take other forms, such as an electrical outlet (FIGS. 8-10, 16, and 17) into which other electrical devices can selectively be inserted to receive a flow of electricity from the outlet.

Accordingly, unlike traditional electrical boxes which merely house the wiring connections formed as a result of an electrical module, such as an electrical outlet or switch, being directly wired to the circuitry 50 of a building, the receptacle 20 of the present disclosure serves as the point of connection to the circuitry 50 of the building and acts as an electrical interface between the circuitry 50 and the module 40. As a result, in the event that it is necessary or desired to replace the module 40, it is not necessary to disrupt the connection between the receptacle 20 and the circuitry 50 of the building. Rather, the module 40 originally forming part of the assembly 10 can be replaced by simply removing it from the cavity 21a of the receptacle 20 and then inserting another module configured to be electrically connected to the receptacle 20 in the manner described herein into the cavity 21a of the receptacle 20. In this way, the assembly 10 of the present disclosure thus alleviates the need for a user to directly engage the wiring 52, 54, 56 of the circuitry 50 of a building when replacing an electrical module, such as a switch or an electrical outlet, thereby simplifying the replacement and reducing the risk of electrical shock in the event the power to the circuitry is not disconnected prior to such engagement. Indeed, as the electrical contacts and internal circuitry of the module 40 through which electricity may flow will typically be insulated from, and not accessible to, users when inserted into the cavity 21a of the receptacle 20, the module 40 may be removed and reinserted into the receptacle 20 or replaced with another module while the receptacle 20 is actively receiving a flow of electricity from the circuitry 50.

It should be appreciated that where reference is made to one component being "electrically connected to" or "electrically connected with" another component, such reference does not necessarily mean that a flow of electricity is actively being supplied to either component; rather, such reference simply indicates that the two components are connected in a manner which permits a flow of electricity to travel from one component to another when a flow of electricity is supplied.

Referring now to FIGS. 1-5, the receptacle 20 includes a body 21, which defines the cavity 21a in which the module 40 is removably inserted. In this exemplary embodiment, the body 21 is defined by, and thus can be characterized as, including a first side panel 22, a second side panel 23, an upper panel 24, a lower panel 25, and a rear panel 26, which collectively form a partially enclosed, single-gang box. In this exemplary embodiment, the body 21 is constructed of a nonconductive material, such as polyphenylene ether (PPE), polystyrene (PS), polycarbonate, or another plastic material. Of course, the dimensions and/or construction of the body 21 can be modified to better accommodate different electrical applications, environments, and/or wiring configurations without departing from the spirit and scope of the present disclosure.

Figure 3:
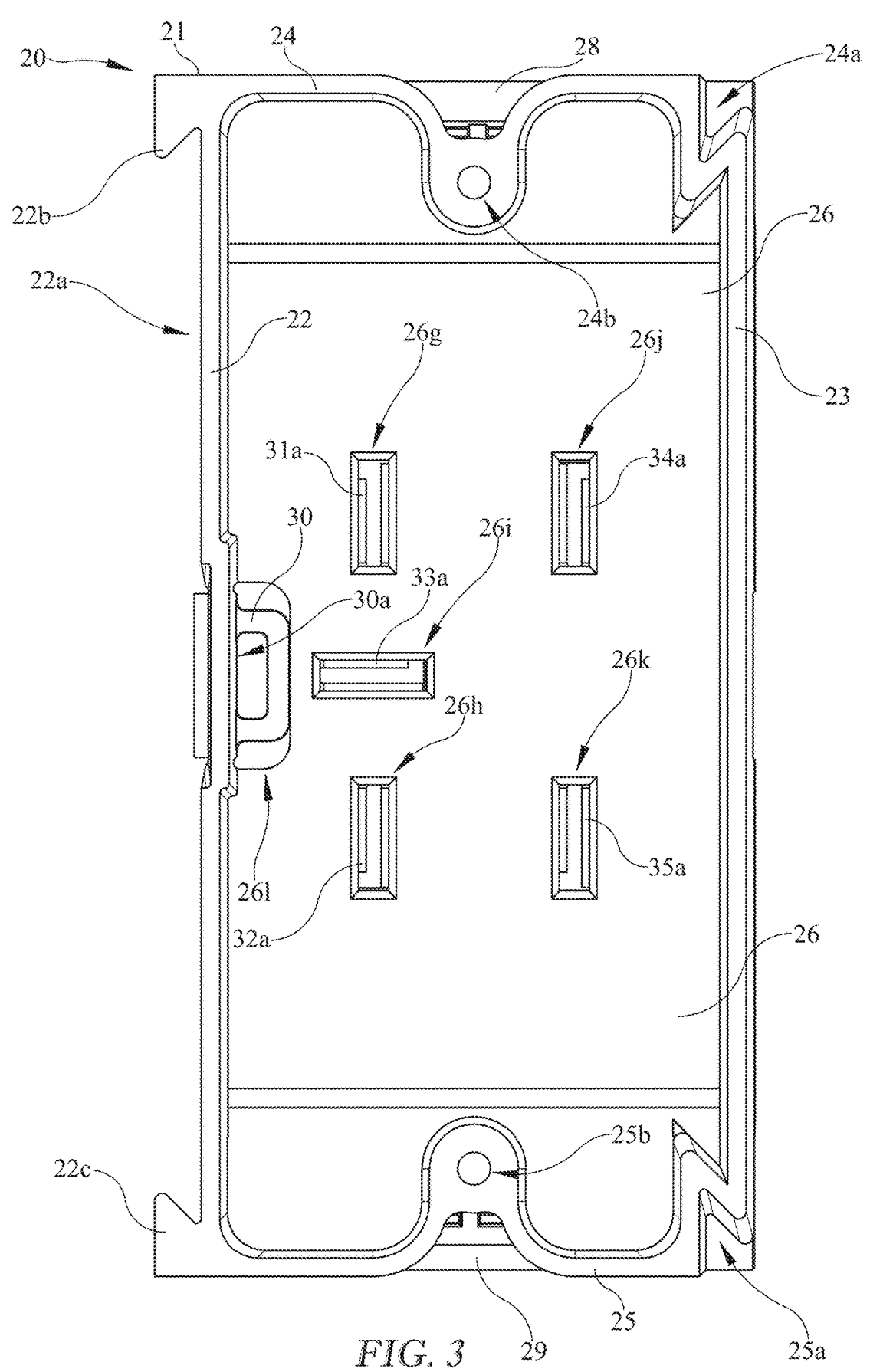
FIG. 3 is a front view of a receptacle of the exemplary assembly of FIG. 1.
Figure 4:
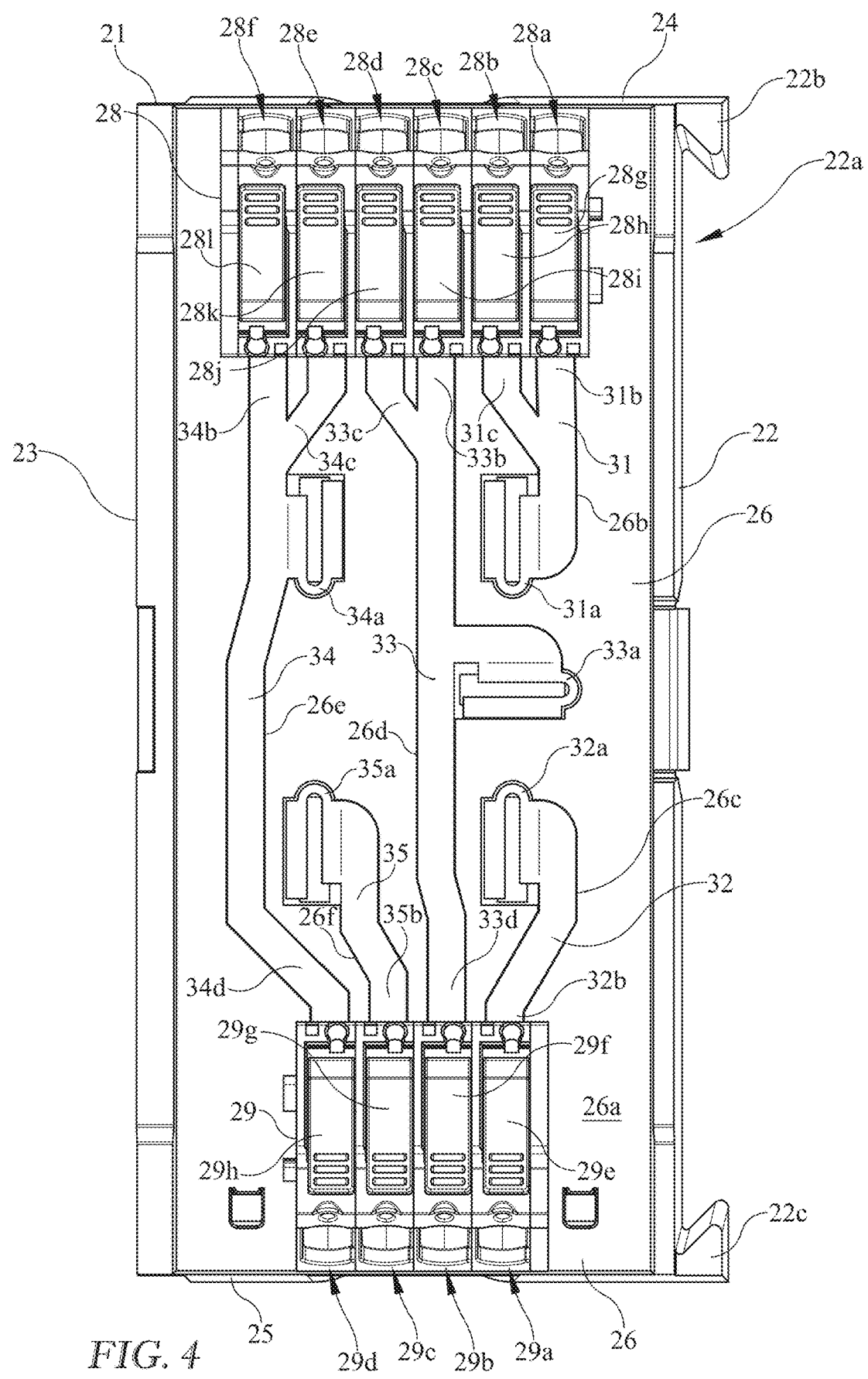
FIG. 4 is a rear view of the receptacle of FIG. 1, but with a cover of the exemplary receptacle removed.

Referring now specifically to FIGS. 2-4, the receptacle 20 further includes two or more electrical contacts 31, 32, 33, 34, 35 which facilitate the flow of electricity through the receptacle 20 when the assembly 10 is in use. In this exemplary embodiment, the electrical contacts 31, 32, 33, 34, 35 are constructed of brass. Of course, other electrically conductive metals may alternatively be utilized without departing from the spirit and scope of the present disclosure. Preferably, the receptacle 20 includes at least three electrical contacts, so that the receptacle 20 includes: at least one electrical contact that, in use, can serve as a hot contact to initially receive a flow of electricity into the receptacle 20; at least one contact that, in use, can serve as a neutral contact from which a flow of electricity from the receptacle 20 can be transmitted back to the circuitry 50 or another electrical device (e.g., a light, fan, etc.) connected thereto, and at least one electrical contact that, in use, can serve as a ground contact. In this exemplary embodiment, the receptacle 20 is configured to be electrically connected to both the wiring 52, 54, 56 of the circuitry 50 of a building as well as to another electrical device via wiring 62, 64, 66, 68. In this regard, and in this exemplary embodiment, the receptacle 20 includes five electrical contacts: a first electrical contact 31; a second electrical contact 32; a third electrical contact 33; a fourth electrical contact 34; and a fifth electrical contact 35, where each respective electrical contact 31, 32, 33, 34, 35 defines an electrically conductive pathway along which a flow of electricity can potentially travel when the assembly 10 is in use. It is appreciated, however, that the number of electrical contacts of the receptacle 20 can be modified to accommodate different electrical applications, environments, and/or wiring configurations without departing from the spirit and scope of the present disclosure. In this regard, one of ordinary skill in the art will readily appreciate that as few as two electrical contacts may be utilized to facilitate the completion or extension of an electrical circuit. Thus, embodiments in which the receptacle 20 includes as few as two electrical contacts: one electrical contact that, in use, can serve as a hot contact; and another electrical contact that, in use, can serve as a neutral contact, are expressly contemplated herein.

Figure 5:
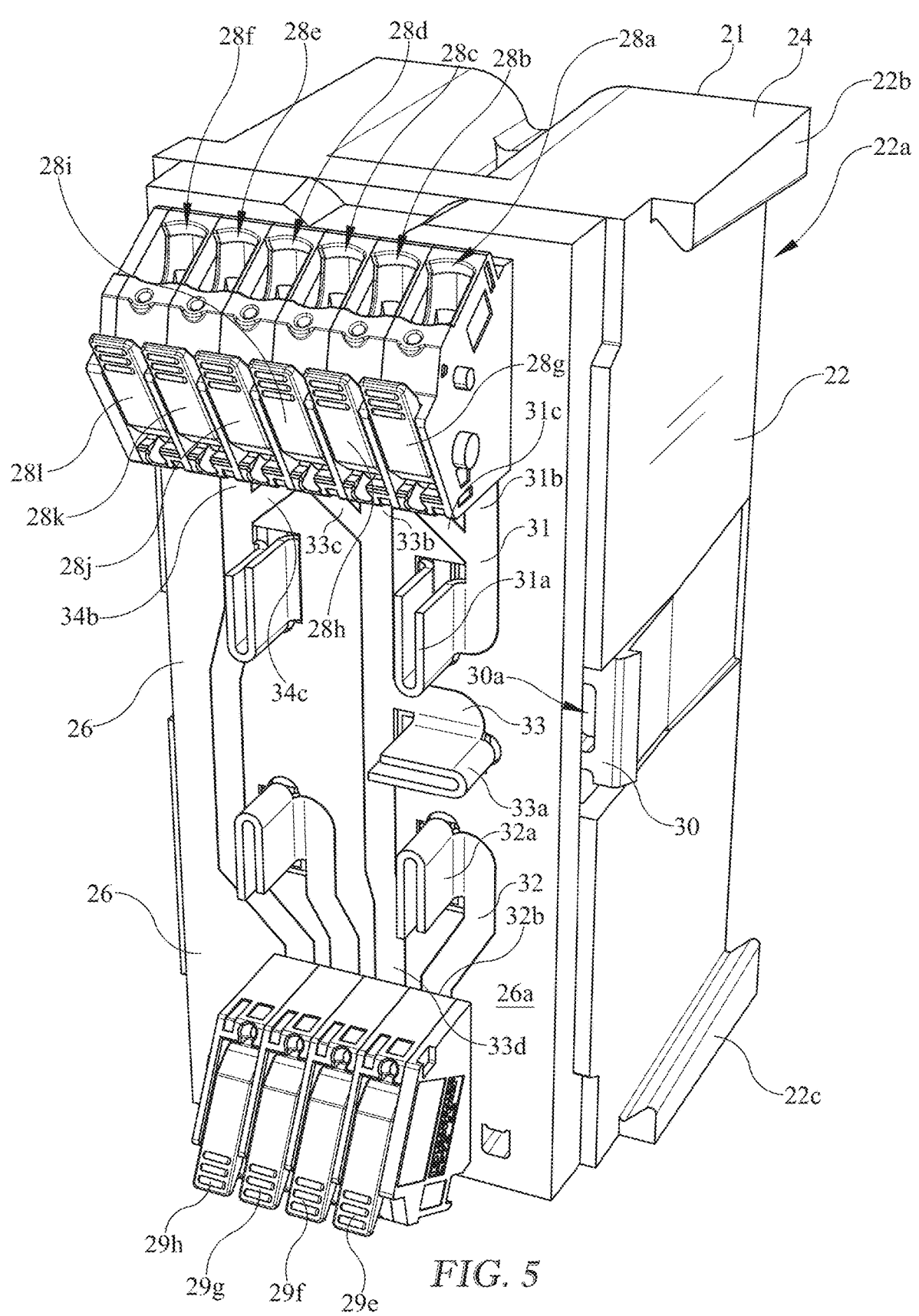
FIG. 5 is a rear perspective view of the receptacle of FIG. 1, but with the cover of the exemplary receptacle removed.

As best shown in FIGS. 4 and 5, in this exemplary embodiment, the electrical contacts 31, 32, 33, 34, 35 are secured to a rear surface 26a of the body 21 that is defined by the rear panel 26. Specifically, in this exemplary embodiment, each electrical contact 31, 32, 33, 34, 35 of the receptacle 20 is deposited within a respective channel 26b, 26c, 26d, 26e, 26f formed in the rear surface 26a of the body 21 that is of substantially corresponding dimension to the electrical contact 31, 32, 33, 34, 35. In some embodiments, the electrical contacts 31, 32, 33, 34, 35 may additionally or alternatively be secured to the rear surface 26a utilizing suitable adhesives or other known means for maintaining the electrical contacts 31, 32, 33, 34, 35 in association with the body 21.

Referring still to FIGS. 4 and 5, in this exemplary embodiment, when the assembly 10 is in use and functioning properly, the first electrical contact 31, the second electrical contact 32, the fourth electrical contact 34, and/or the fifth electrical contact 35 will typically be the electrical contacts of the receptacle 20 through which a flow of electricity will be passed, depending on the manner in which the receptacle 20 is wired and the electrical contact configuration of the module 40. In this exemplary embodiment, the third electrical contact 33 serves as a ground and will ordinarily only receive a flow of electricity if the assembly 10 is malfunctioning, such as by the occurrence of a short circuit. Each electrical contact 31, 32, 33, 34, 35 of the receptacle 20 includes a terminal 31a, 32a, 33a, 34a, 35a which can serve as a point of potential electrical connection to the module 40. Accordingly, such terminals 31a, 32a, 33a, 34a, 35b may be characterized as terminals corresponding to the module 40. Depending on the manner in which the receptacle 20 is wired and the electrical contact configuration of the module utilized in the assembly 10, the terminal 31a, 32a, 34a, 35a of the first electrical contact 31, the second electrical contact 32, the fourth electrical contact 34, and/or the fifth electrical contact 35 corresponding to the module may transmit a flow of electricity to the module, receive a flow of electricity from the module, or not have any flow of electricity passing therethrough when the assembly 10 is in use. As the third electrical contact 33 of the receptacle is, in this exemplary embodiment, a ground, the terminal 33a of the third electrical contact 33 corresponding to the module 40 will typically only receive a flow of electricity if the assembly 10 is malfunctioning.

Referring still to FIGS. 4 and 5, each electrical contact 31, 32, 33, 34, 35 of the receptacle 20 also includes one or more additional terminals 31b, 31c, 32b, 33b, 33c, 33d, 34b, 34c, 34d, 35b which can serve as point of potential electrical connection to the circuitry 50 or to another electrical device to which the electrical contact 31, 32, 33, 34, 35 of the one or more additional terminals 31b, 31c, 32b, 33b, 33c, 33d, 34b, 34c, 34d, 35b is electrically connected. Accordingly, these additional terminals 31b, 31c, 32b, 33b, 33c, 33d, 34b, 34c, 34d, 35b may also be characterized as "interface terminals." Depending on the manner in which the receptacle 20 is electrically connected to the circuitry 50 of the building or to another electrical device (e.g., another receptacle of like construction), each of the one or more interface terminals 31b, 31c, 32b, 34b, 34c, 34d, 35b of the first electrical contact 31, the second electrical contact 32, the fourth electrical contact 34, and the fifth electrical contact 35 can serve as either (i) a point of potential electrical connection at which a flow of electricity is received from the circuitry 50 or another electrical device or (ii) from which a flow of electricity is transmitted to the circuitry 50 or another electrical device, or not have any flow of electricity passing therethrough when the assembly 10 is in use. The one or more interface terminals 33b, 33c, 33d of the third electrical contact 33 will typically only receive a flow of electricity if the assembly 10 is malfunctioning as, in this exemplary embodiment, the third electrical contact 33 is a ground. As further shown, in this exemplary embodiment: the second electrical contact 32 and the fifth electrical contact 35 each include one interface terminal 32b, 35b; the first electrical contact 31 includes two interface terminals 31b, 31c; and the third electrical contact 33 and the fourth electrical contact 34 each include three interface terminals 33b, 33c, 33d, 34b, 34c, 34d. Accordingly, the first electrical contact 31, the third electrical contact 33, and the fourth electrical contact 34 can potentially receive a flow of electricity from multiple sources or transmit a flow of electricity to multiple targets, such as the circuitry 50 or another electrical device, depending on the manner in which the receptacle 20 is wired. Of course, the number of interface terminals the first electrical contact 31, the second electrical contact 32, the third electrical contact 33, the fourth electrical contact 34, and/or the fifth electrical contact 35 have may be modified to accommodate different electrical applications, environments, and/or wiring configurations without departing from the spirit and scope of the present disclosure.

Referring now to FIGS. 2-5, in this exemplary embodiment, each electrical contact 31, 32, 33, 34, 35 is accessible from the interior of the cavity 21*a* via an opening 26*g*, 26*h*, 26*i*, 26*j*, 26*k* defined by the rear panel 26 of the body 21, such that a portion of the module 40 can be inserted through one of the openings and into electrical connection with the electrical contact 31, 32, 33, 34, 35 (as further discussed below). Depending on the electrical contact configuration of the module 40, some or all of the electrical contacts 31, 32, 33, 34, 35 may be contacted by the module 40 when inserted into the cavity 21*a* of the receptacle 20. For clarity in illustration, only FIG. 3 is provided with reference numerals for the openings 26*g*, 26*h*, 26*i*, 26*j*, 26*k* defined by the rear panel 26. Each opening 26*g*, 26*h*, 26*i*, 26*j*, 26*k* is aligned with, and thus may be characterized as corresponding to, one of the terminals 31*a*, 32*a*, 33*a*, 34*a*, 35*a* of the electrical contacts 31, 32, 33, 34, 35 that correspond to the module 40. As best shown in FIGS. 4 and 5, in this exemplary embodiment, each of the terminals 31*a*, 32*a*, 33*a*, 34*a*, 35*a* corresponding to the module 40 are shaped as to define a slot that is aligned with one of the openings 26*g*, 26*h*, 26*i*, 26*j*, 26*k* defined by the rear panel 26, the importance of which is further discussed below.

Referring now again to FIGS. 1-5, in this exemplary embodiment, the receptacle 20 further includes a first terminal connector 28 and a second terminal connector 29 which at least partially cover the interface terminals 31*b*, 31*c*, 32*b*, 33*b*, 33*c*, 33*d*, 34*b*, 34*c*, 34*d*, 35*b* of the electrical contacts 31, 32, 33, 34, 35 of the receptacle 20. The first terminal connector 28 and the second terminal connector 29 are secured to the rear surface 26*a* defined by rear panel 26 and facilitate wiring of the receptacle 20 to the respective wires 52, 54, 56 of the circuitry 50 and/or to the respective wires 62, 64, 66, 68 which can be used to electrically connect the receptacle 20 to another electrical device. In this regard, the first terminal connector 28 and the second terminal connector 29 can be selectively manipulated to maintain some or all of interface terminals 31*b*, 31*c*, 32*b*, 33*b*, 33*c*, 33*d*, 34*b*, 34*c*, 34*d*, 35*b* of the electrical contacts 31, 32, 33, 34, 35 in electrical connection with the terminal end of one or more wires 52, 54, 56, 62, 64, 66, 68 corresponding to the circuitry 50 of a building or another electrical device and deposited in the first terminal connector 28 or the second terminal connector 29.

Referring still to FIGS. 1-5, in this exemplary embodiment, the first terminal connector 28 and the second terminal connector 29 are in the form of lever nut connectors. In this regard, and in this exemplary embodiment, the first terminal connector 28 includes six openings 28*a*, 28*b*, 28*c*, 28*d*, 28*e*, 28*f* in which the terminal end of a wire can be placed and six corresponding levers 28*g*, 28*h*, 28*i*, 28*j*, 28*k*, 28*l*, where each respective opening 28*a*, 28*b*, 28*c*, 28*d*, 28*e*, 28*f* and corresponding lever 28*g*, 28*h*, 28*i*, 28*j*, 28*k*, 28*l* are associated with one of the interface terminals 31*b*, 31*c*, 33*b*, 33*c*, 34*b*, 34*c* of the first electrical contact 31, the third electrical contact 33, or the fourth electrical contact 34. Each respective lever 28*g*, 28*h*, 28*i*, 28*j*, 28*k*, 28*l* of the first terminal connector 28 can be transitioned between: (i) a closed position (FIGS. 1-5) to maintain the terminal end of a wire deposited in the opening 28*a*, 28*b*, 28*c*, 28*d*, 28*e*, 28*f* corresponding to the lever 28*g*, 28*h*, 28*i*, 28*j*, 28*k*, 28*l* in association with the interface terminal 31*b*, 31*c*, 33*b*, 33*c*, 34*b*, 34*c* with which the lever 28*g*, 28*h*, 28*i*, 28*j*, 28*k*, 28*l* is associated; and (ii) an open position (not shown) to permit removal or insertion of the wiring into the opening 28*a*, 28*b*, 28*c*, 28*d*, 28*e*, 28*f* corresponding to the lever 28*g*, 28*h*, 28*i*, 28*j*, 28*k*, 28*l*. In this exemplary embodiment, the second terminal connector 29 is of the same construction and functions in the same general manner as the first terminal connector 28, except that the second terminal connector 29 includes only four openings 29*a*, 29*b*, 29*c*, 29*d* and four corresponding levers 29*e*, 29*f*, 29*g*, 29*h*, where each respective opening and corresponding lever 29*a*, 29*b*, 29*c*, 29*d* are associated with one of the interface terminals 32*b*, 33*d*, 34*d*, 35*b* of the second electrical contact 32, the third electrical contact 33, or the fifth electrical contact 35. Suitable lever nuts which may be utilized as the first terminal connector 28 and the second terminal connector 29 include those manufactured and distributed under the registered trademark WAGO® by WAGO Verwaltungsgesellschaft mbH of Minden, Germany.

Referring now to FIGS. 1 and 2, in this exemplary embodiment, the receptacle 20 further includes a cover 27 which is secured to the rear surface 26*a* defined by the rear panel 26 and covers the portion of the electrical contacts 31, 32, 33, 34, 35 not covered by the first terminal connector 28 and the second terminal connector 29. In this exemplary embodiment, the cover 27 is constructed of an electrically insulating material, such as PVC or polycarbonate. Accordingly, in addition to shielding the electrical contacts 31, 32, 33, 34, 35 from the environment in which the receptacle 20 is located, in this exemplary embodiment, the cover 27 also serves to reduce the risk of an individual being shocked in instances where the rear of receptacle 20 is contacted while the assembly 10 is in use.

Referring now again to FIGS. 1-5, in this exemplary embodiment, the receptacle 20 includes a female connector to facilitate mounting of the body 21, and thus the receptacle 20 as a whole, to a mounting plate 12 (FIG. 1). Specifically, in this exemplary embodiment, the female connector is located on a first side of the body 21 and is in the form of a slot 22*a* that is defined at least in part by a first protuberance 22*b* and a second protuberance 22*c* provided on an exterior surface of the first side panel 22 of the body 21. In this exemplary embodiment, the first protuberance 22*b* and the second protuberance 22*c* are integrally formed with the first side panel 22 of the body 21. The slot 22*a*, in this exemplary embodiment, is sized to receive a male member 12*a* of the mounting plate 12, such that the male member 12*a* of the mounting plate 12 can be inserted into the slot 22*a* to interlock the mounting plate 12 and the body 21 of the receptacle 20 together. As shown best in FIG. 1, the receptacle 20 can be mounted to a structure 14 of a building by first mounting the mounting plate 12 to the structure 14 and then inserting the male member 12*a* of the mounting plate 12 into the slot 22*a*. Additional features of the mounting plate 12 shown in FIG. 1 are provided in the discussion of the mounting plate 412 shown in FIGS. 11, 15, and 16, which is of the same construction as the mounting plate 12 in FIG. 1.

Figure 12A:
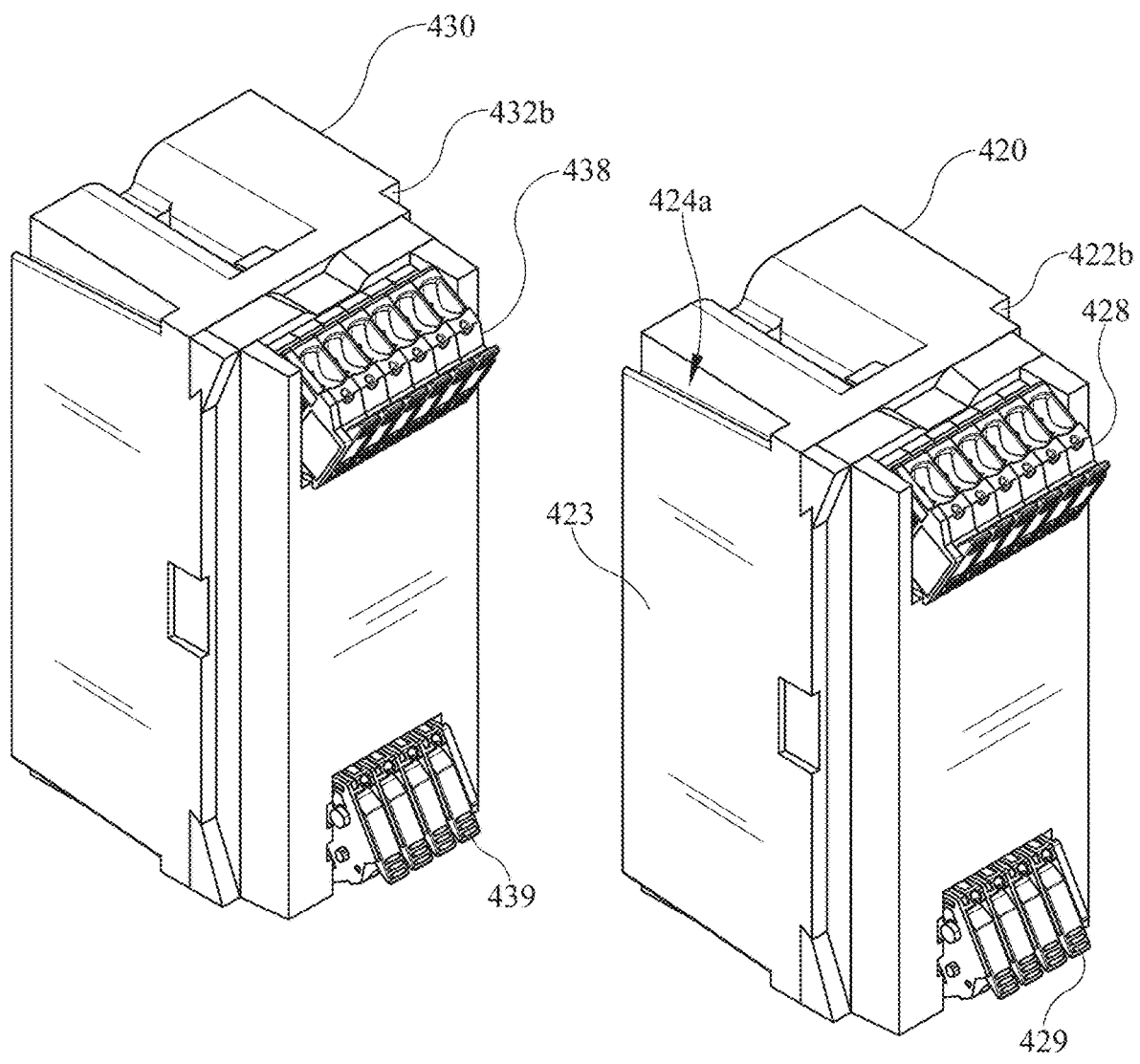
FIG. 12A is a perspective of a first exemplary receptacle and a second exemplary receptacle made in accordance with the present disclosure.
Figure 12B:
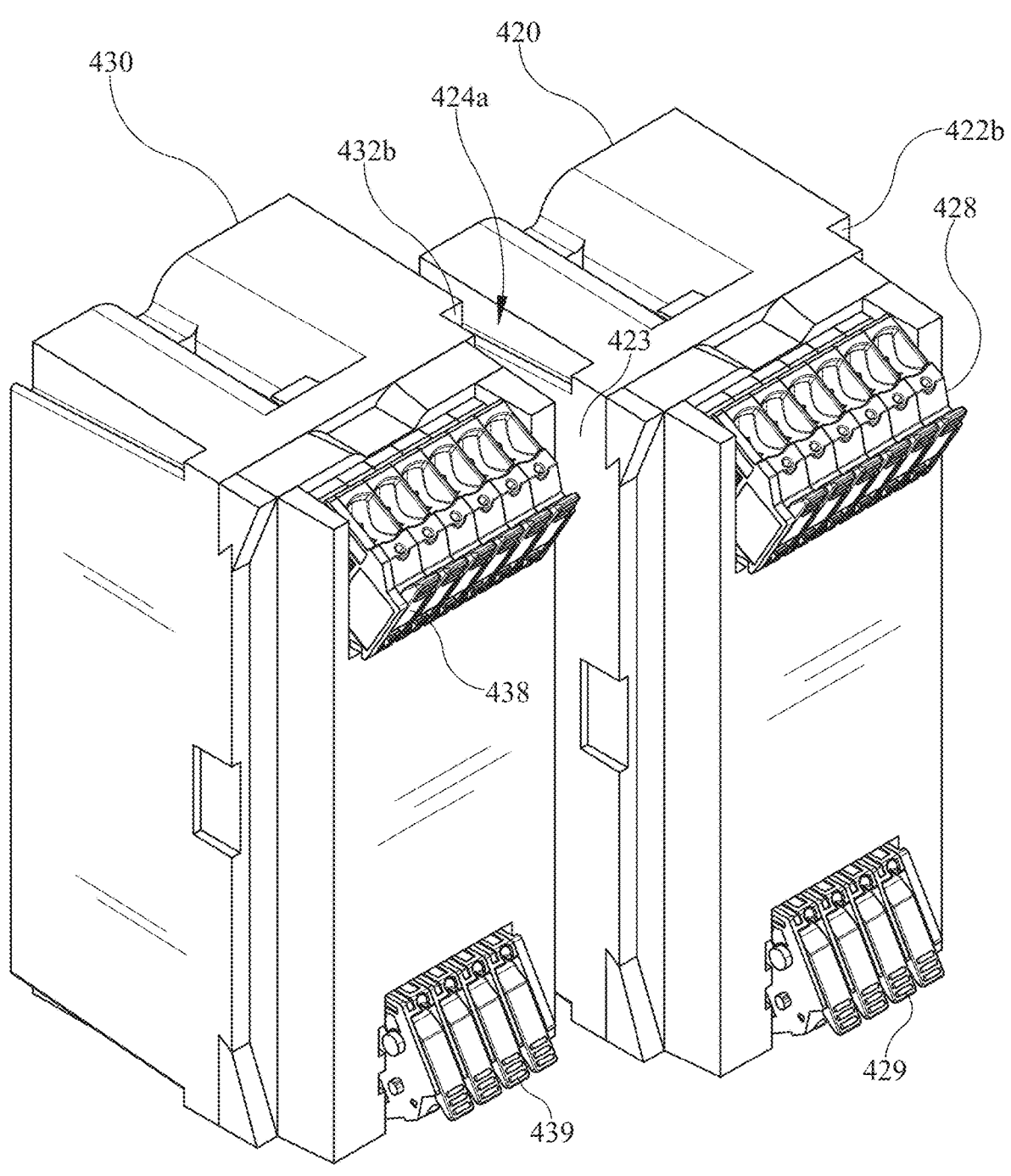
FIG. 12B is another perspective view of the first exemplary receptacle and the second exemplary receptacle of FIG. 12A, but with the first exemplary receptacle and the second exemplary receptacle partially mated together.
Figure 12C:
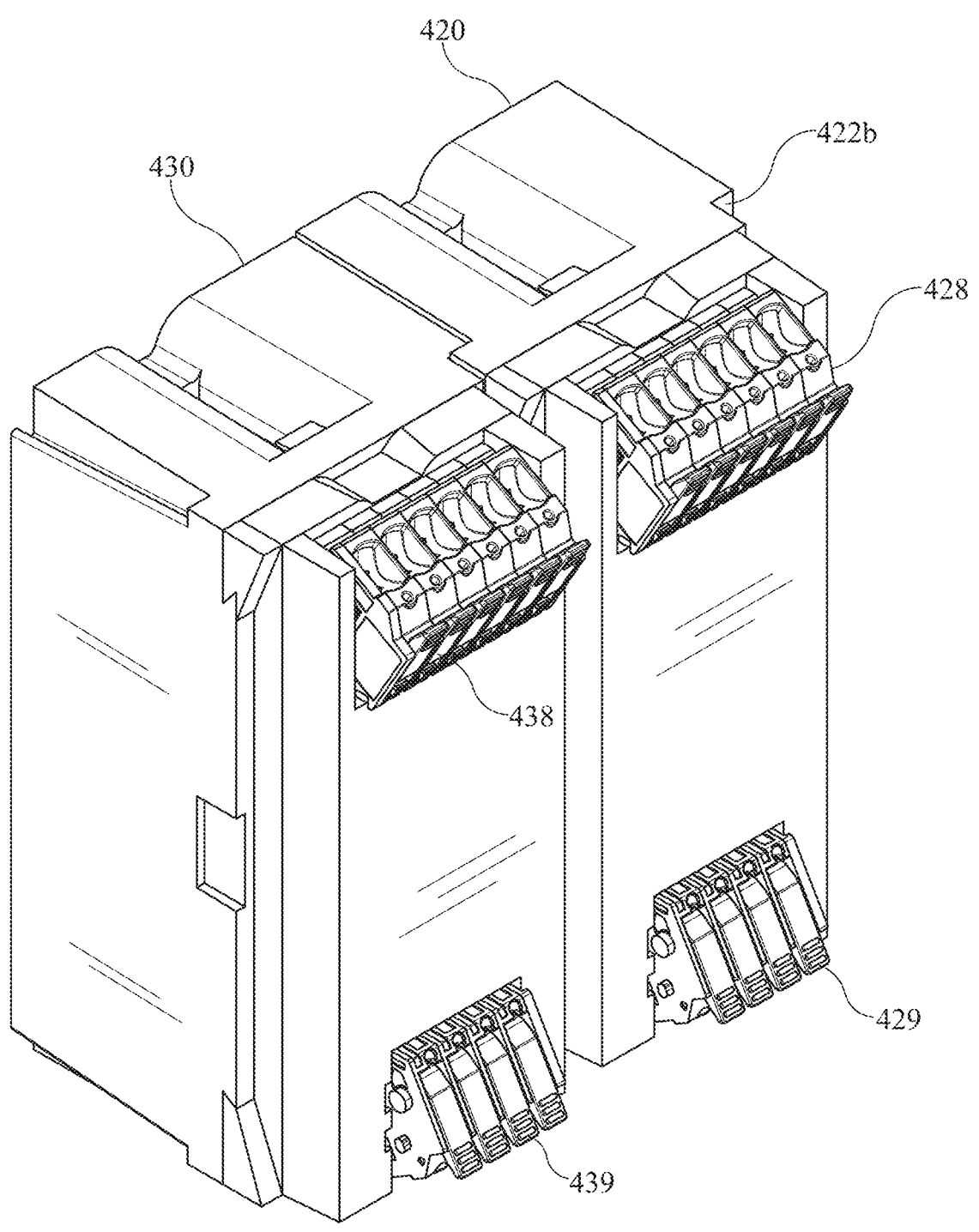
FIG. 12C is another perspective view of the first exemplary receptacle and the second exemplary receptacle of FIG. 12A, but with the first exemplary receptacle and the second exemplary receptacle fully mated together.
Figure 13:
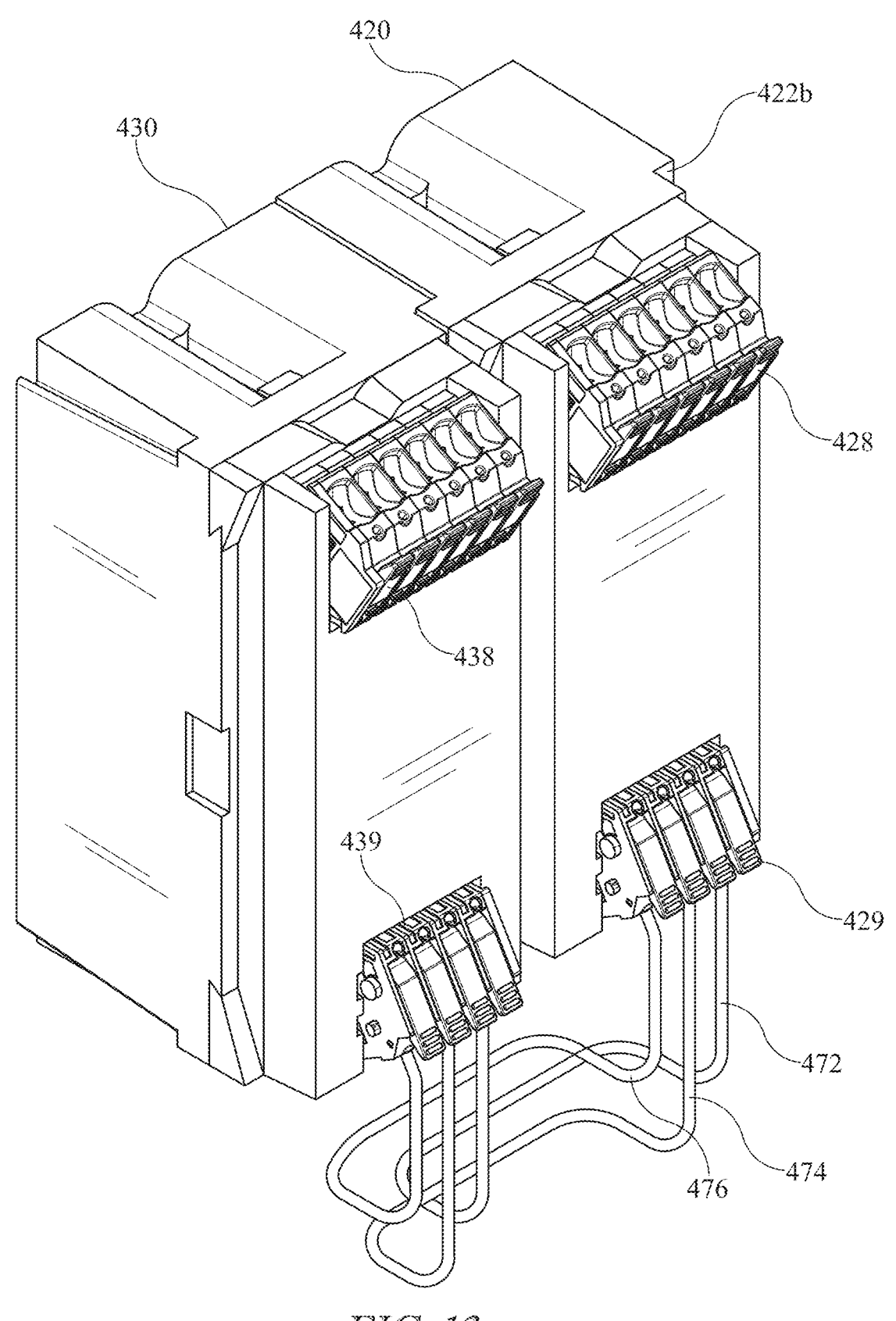
FIG. 13 is another perspective view of the first exemplary receptacle and the second exemplary receptacle of FIG. 12C, but with a set of electrical wires electrically connecting the first exemplary receptacle to the second exemplary receptacle.

Referring still to FIGS. 1-5, in this exemplary embodiment, the receptacle 20 also includes a male connector located opposite of the female connector on a second side of the body 21. As will become evident in the discussion below regarding the attachment of receptacles 420 and 430 with reference to FIGS. 12A-12C, the male connector of the receptacle 20 facilitates mounting of the body 21, and thus the receptacle 20 as a whole, to other receptacles of like construction so that the assembly 10 can be readily expanded to include multiple receptacles and provide a multi-gang arrangement. In this exemplary embodiment, a first indentation 24*a* defined by the upper panel 24 and a second indentation 25*a* defined by the lower panel 25 of the body 21 permit the second side panel 23 to be inserted into the slot of another receptacle of like construction. Accordingly, in this exemplary embodiment, the second side panel 23, the first indentation 24*a*, and a second indentation 25*a* collectively define the male connector of the receptacle 20. Accordingly, in this exemplary embodiment, both the female connector and the male connector of the receptacle 20 are defined by the body 21 of the receptacle. To facilitate mating of the receptacle 20 with other receptacles of like construction, in this exemplary embodiment, the second side panel 23 is sized and shaped for insertion into a slot of the same dimension as the slot 22a forming the female connector of the receptacle 20. That is, in this exemplary embodiment, the male connector of the receptacle 20 is of substantially similar dimension to the male member 12a of the mounting plate 12.

It is appreciated that the male-female connections described above facilitating connection of the receptacle 20 to the mounting plate 12 and the receptacle 20 to another receptacle of like construction can be reversed without departing from the spirit and scope of the present disclosure. In this regard, embodiments in which the mounting plate 12 includes a female member, such as a slot, in which the male connector of the receptacle 20 is inserted, as well as embodiments, in which the female connector of the receptacle 20 facilitates the attachment of an additional receptacle of like construction, are expressly contemplated herein.

Referring now to FIGS. 1-3, in this exemplary embodiment, the receptacle 20 further includes an interior bracket 30 provided on an interior surface of the first side panel 22 which defines an opening 30a configured to receive the head of a screwdriver so that additional leverage can be implemented, if needed, to disassociate the receptacle 20 from the mounting plate 12 or to another receptacle of like construction to which the receptacle 20 may be attached. Further to this end, in this exemplary embodiment, the first side panel 22 and the rear panel 26 each define, and thus may be characterized as including, one or more slits 22d, 22e, 261 which permit a portion of the first side panel 22 located proximate to the interior bracket 30 to flex as leverage is applied to the screwdriver.

Figure 6:
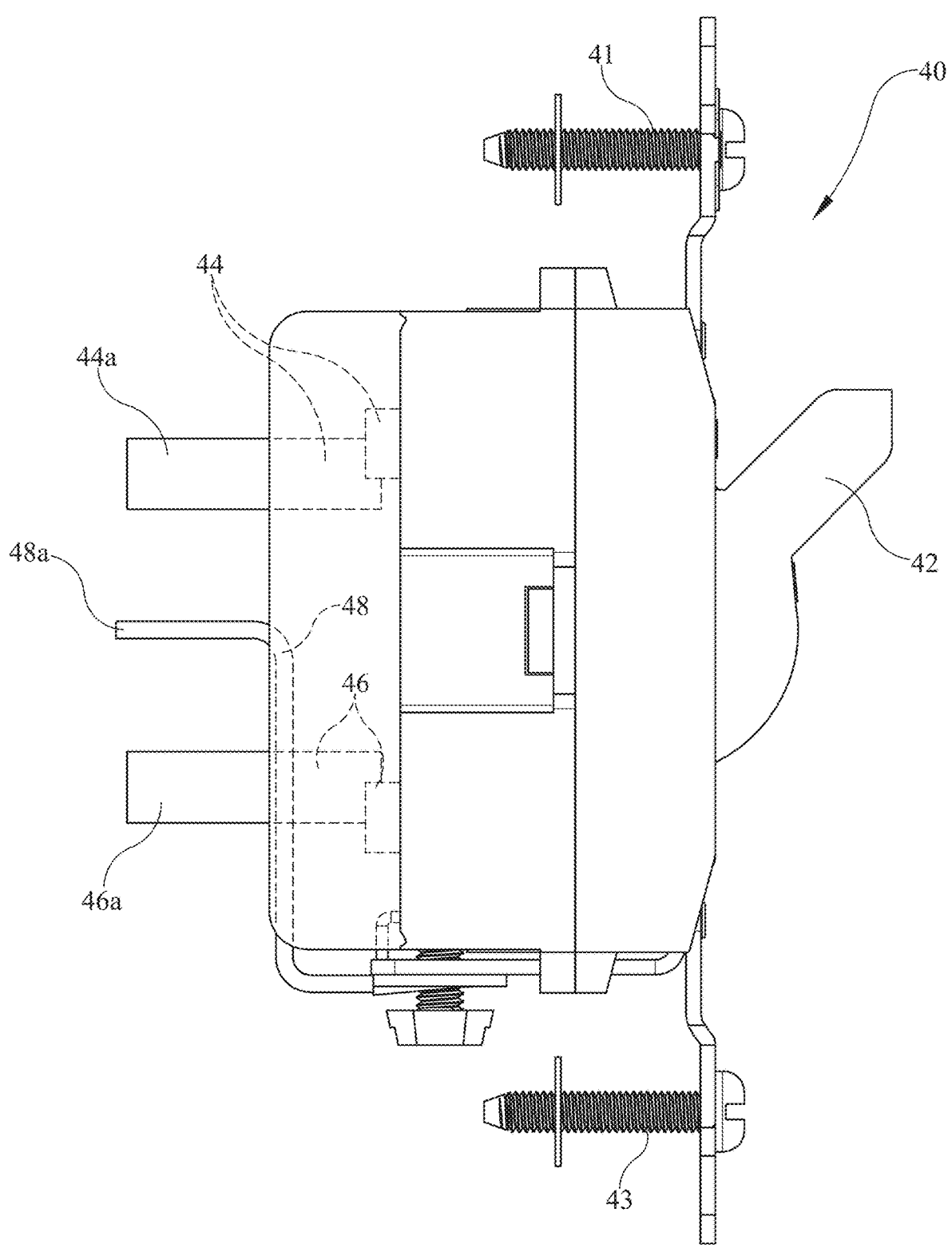
FIG. 6 is a side view of a module of the exemplary assembly of FIG. 1.

Referring now to FIGS. 1, 2, and 6, in this exemplary embodiment, the module 40 is in the form of a toggle switch. Consistent with toggle switches of known construction, the module 40, in this exemplary embodiment, also includes a switch 42 that can be selectively transitioned between a first (or "ON") position to close a switch (not shown) in the internal circuitry (not shown) of the module 40 to permit the electricity to flow through the module 40 and a second (or "OFF") position to open the switch and prevent electricity from flowing through the module 40. Unlike toggle switches or other electrical modules commonly inserted into a junction box, however, the exemplary module 40 is, as noted, configured to be electrically connected to the receptacle 20. In this regard, the module 40 includes at least two electrical contacts 44, 46, 48 that are electrically connected to the internal circuitry of the module 40 and include terminals 44a, 46a, 48a that can be placed into electrical contact with corresponding terminals of the electrical contacts of the receptacle 20 by inserting the module 40 into the cavity 21a of the body 21.

Referring still to FIGS. 1, 2, and 6, in this exemplary embodiment, the module includes three electrical contacts: a first electrical contact 44; a second electrical contact 46; and a third electrical contact 48. As shown, in this exemplary embodiment, the terminal 44a of the first electrical contact 44, the terminal 46a of the second electrical contact 46, and the terminal 48a of the third electrical contact 48 are in the form of a "first prong," a "second prong," and a "third prong," respectively. As best shown in FIG. 2, in this exemplary embodiment, the terminal 44a of the first electrical contact 44, the terminal 46a of the second electrical contact 46, and the terminal 48a of the third electrical contact 48 of the module 40 are oriented and spaced apart from each other so that such terminals 44a, 46a, 48a can be simultaneously inserted through openings 26g, 26h, 26i of the body 21 and into contact with the first electrical contact 31, the second electrical contact 32, and the third electrical contact 33, respectively, of the receptacle 20. In this regard, as the terminal 44a of the first electrical contact 44, the terminal 46a of the second electrical contact 46, and the terminal 48a of the third electrical contact 48 are inserted through openings 26g, 26h, 26i of the body 21, they are received in the slots defined by the terminals 31a, 32a, 33a of the first electrical contact 31, the second electrical contact 32, and the third electrical contact 33, respectively, of the receptacle 20. Preferably, the width of the slots defined by the terminals 31a, 32a, 33a corresponding to the module 40 of the first electrical contact 31, the second electrical contact 32, and the third electrical contact 33 substantially corresponds to that of the terminal 44a of the first electrical contact 44, the terminal 46a of the second electrical contact 46, and the terminal 48a of the third electrical contact 48 of the module 40. As a result of such construction, the terminals 44a, 46a, 48a of the module 40 snugly fit within the slots defined by the corresponding terminals of the receptacle 20, and the module 40 is maintained within the cavity 21a of the receptacle 20 by such engagement alone. To further help ensure that the terminals 44a, 46a, 48a of the module 40 do not inadvertently become disconnected from the corresponding terminals 31a, 32a, 33a of the receptacle 20 when the assembly 10 is in use, in this exemplary embodiment, the module 40 further includes fasteners 41, 43 which can be deposited into corresponding openings 24b, 25b defined by the upper panel 24 and the lower panel 25 of the body 21.

Although the module 40 described above with reference to FIGS. 1, 2, and 6 is generally identified as including at least three electrical contacts, it should be appreciated that such module 40 is not necessarily limited to such construction. Rather, as few as two electrical contacts may be utilized to facilitate the transmission of a flow of electricity without departing from the spirit and scope of the present disclosure. Accordingly, embodiments in which the module 40 described above with reference to FIGS. 1, 2, and 6 include two electrical contacts are also contemplated herein. Furthermore, while the switch-type module 40 described above with reference to FIGS. 1, 2, and 6 is primarily described herein as being in the form of a toggle switch, it should be appreciated that other types of switches may also be utilized in combination with the various receptacles disclosed herein. For instance, in some alternative embodiments, instead of a toggle switch, a rotary switch may be utilized.

Figure 7A:
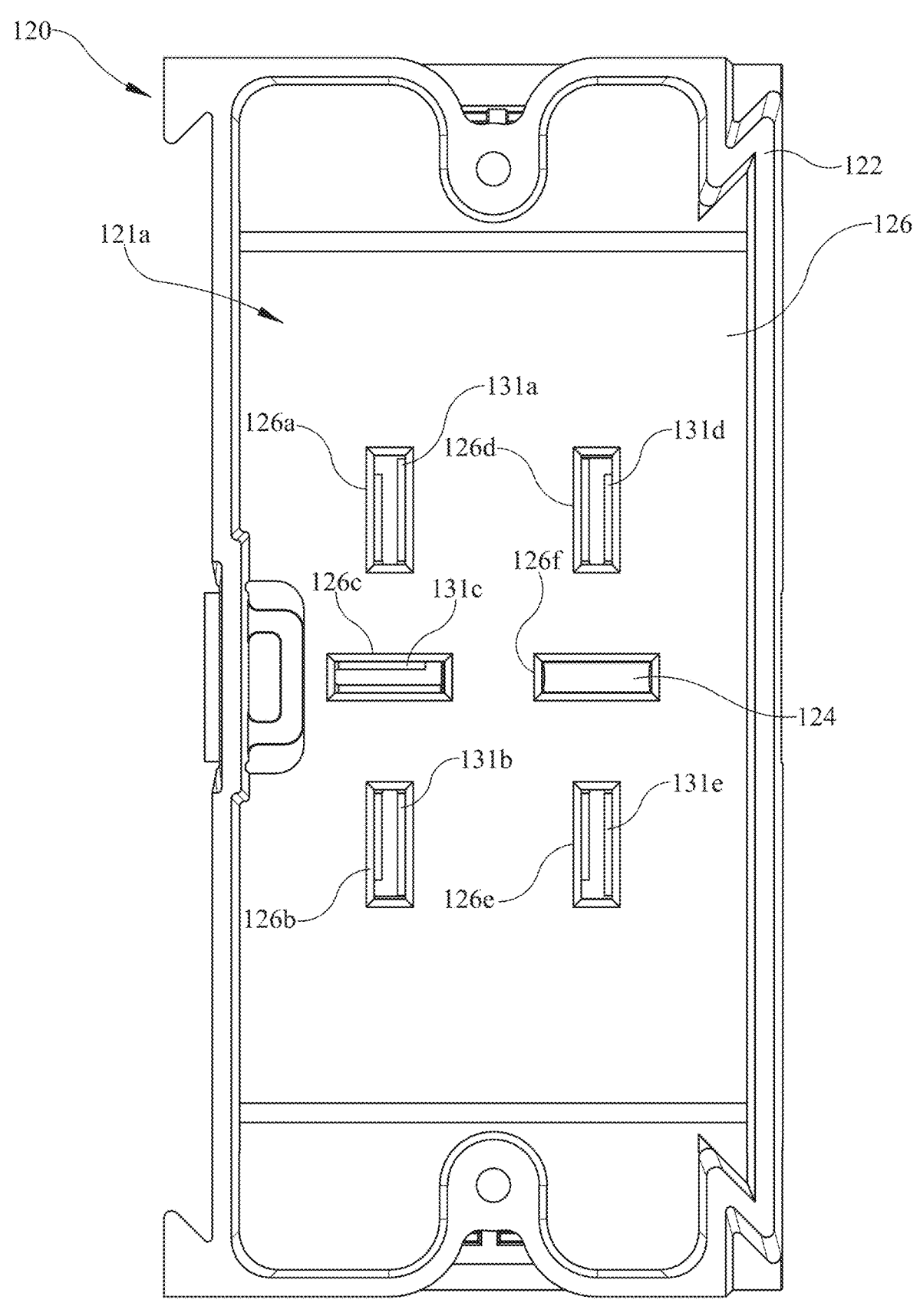
FIG. 7A is a front view of another exemplary receptacle made in accordance with the present disclosure.
Figure 7B:
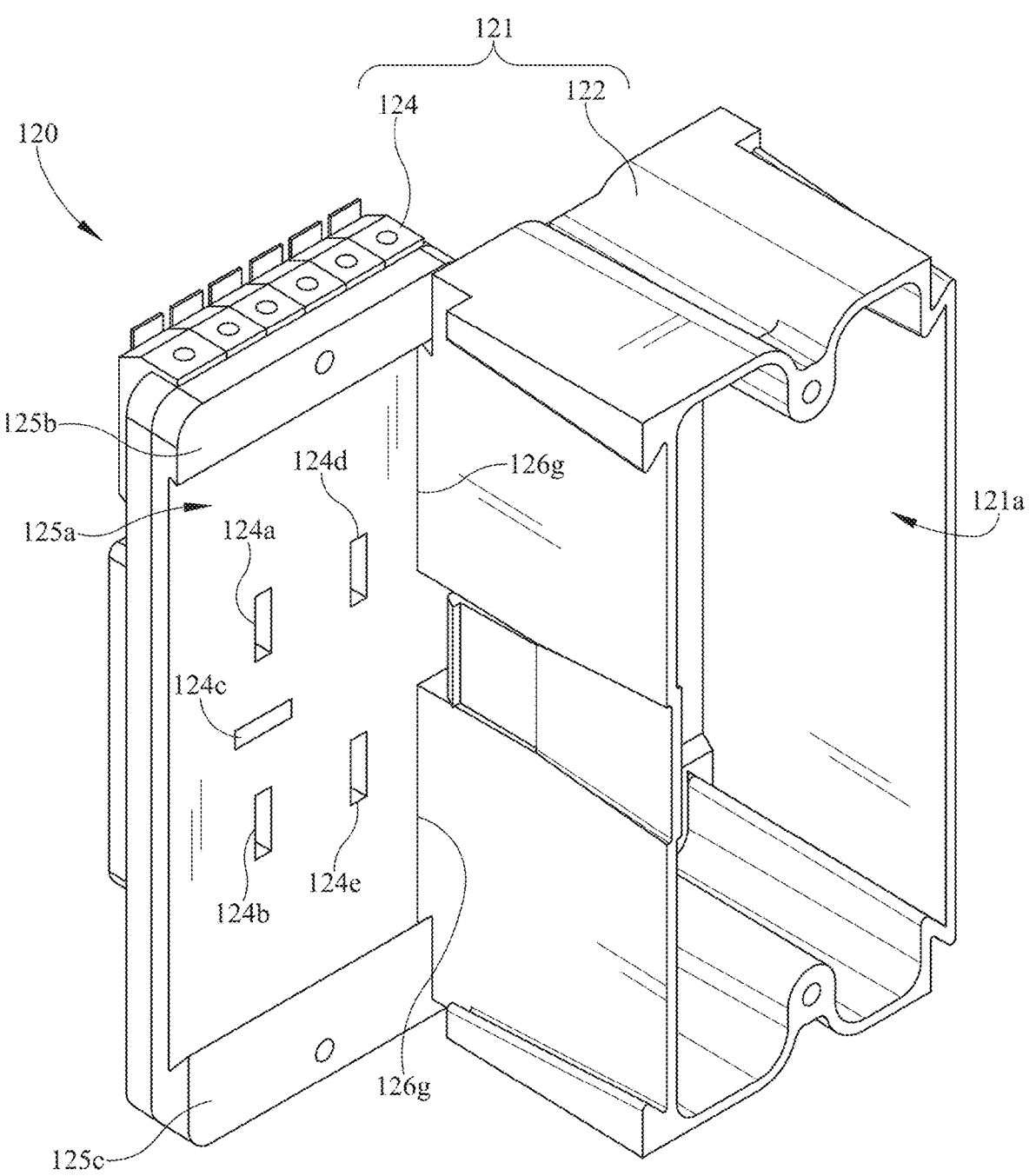
FIG. 7B is a perspective view of the exemplary receptacle of FIG. 7A, but with a first body member and a second body member of the exemplary receptacle in a different position relative to each other.

It should be appreciated that while the assembly 10 is referred to above as including the exemplary receptacle 20 described above with reference to FIGS. 1-5 and the exemplary module 40 described above with reference to FIGS. 1, 2, and 6, that, in alternative embodiments, the assembly 10 may include a receptacle and/or module of alternative type or construction. For instance, FIGS. 7A and 7B show another exemplary receptacle 120 which may be utilized in the assembly 10 in place of the receptacle 20 described above with reference to FIGS. 1-5. The receptacle 120 in this exemplary embodiment is of the same general construction and functions in the same general manner as the receptacle 20 described above with reference to FIGS. 1-5. However, in this exemplary embodiment, the body 121 of the receptacle 120 is defined by, and thus may be characterized as including, two body members: a first body member 122 which defines the cavity 121a of the body 121; and a second body member 124 which is removably secured to the first body member 122, and to which the terminals 131a, 131b, 131c, 131d, 131e of the electrical contacts of the receptacle 120 are attached to a rear surface of. As shown by viewing FIGS. 7A and 7B in sequence, in this exemplary embodiment, the first body member 122 and the second body member 124 are removably secured to each other via a male connector and a female connector connection, which permits the first body member 122 and the second body member 124 to slide toward or away from each other to facilitate assembly or disassembly of the body 121, respectively. In this exemplary embodiment, the female connector is in the form of a slot 125a that is defined at least in part by a first protuberance 125b and a second protuberance 125c of the second body member 124, while the male connector is in the form of a protuberance 126g which is defined by one or more edges of a rear panel of the first body member 122, spans a width of the first body member 122, and is sized and shaped for insertion into the slot 125a of the second body member 124. Of course, in alternative embodiments, the female connector may be defined by the first body member 122 and the male connector may be defined by the second body member 124 without departing from the spirit and scope of the present disclosure.

Referring still to FIGS. 7A and 7B, as shown, a rear panel 126 of the first body member 122 defines a total of six openings 126a, 126b, 126c, 126d, 126e, 126f, and the second body member 124 defines a total of five openings 124a, 124b, 124c, 124d, 124e. As shown best in FIG. 7A, when the protuberance 126g defined by the first body member 122 is fully inserted into the slot 125a defined by the second body member 124, five of the six openings defined by the first body member 122, which, in the configuration shown in FIG. 7A, are openings 126a, 126b, 126c, 126d, 126e, are aligned with the five openings 124a, 124b, 124c, 124d, 124e defined by second body member 124, thus providing access to terminals 131a, 131b, 131c, 131d, 131e of the electrical contacts of the receptacle 120. Accordingly, in this exemplary embodiment, the openings in the body 121 providing access to the terminals 131a, 131b, 131c, 131d, 131e are collectively defined by aligned openings of the first body member 122 and the second body member 124. In the assembled receptacle 120 configuration shown in FIG. 7A, opening 126f defined by the first body member 122 is not aligned with an opening defined by the second body member 124, and thus does not provide access to a terminal 131a, 131b, 131c, 131d, 131e of the electrical contacts of the receptacle 120. However, the design of the female connector and the male connector of the body 121 described above permits the orientation of the first body member 122 and the second body member 124, and thus the openings defined thereby, to be readily changed by a user.

Referring still to FIGS. 7A and 7B, to alter the orientation of the first body member 122 and the second body member 124 relative to each other, the protuberance 126g defined by the first body member 122 is first removed from insertion within the slot 125a defined by the second body member 124 to disassemble the body 121. Once the body 121 of the receptacle is disassembled, either the first body member 122 or the second body member 124 can be rotated 180° to reorient the first body member 122 and the second body member 124 relative to each other (i.e., reoriented relative to orientation the first body member 122 and the second body member 124 were in prior to disassembly of the body 121). Once the first body member 122 and the second body member 124 are reoriented relative to each other, the protuberance 126g defined by the first body member 122 is inserted into the slot 125a defined by the second body member 124 until five of the six openings defined by the first body member 122 are aligned with the five openings 124a, 124b, 124c, 124d, 124e defined by second body member 124. Accordingly, by following the foregoing steps and starting with the orientation shown in FIG. 7A, the first body member 122 and the second body member 124 can be reoriented so that openings 126a, 126b, 126d, 126e, and 126f defined by the first body member 122 are aligned with, and correspond to, openings 124e, 124d, 124b, 124e, and 124c, respectively, defined by the second body member 124. Accordingly, the body 121 construction of receptacle 120 in this exemplary embodiment may prove particularly useful in instances where it is desirable for either the terminals 131a, 131b, 131c, 131d, 131e or the features defined by the first body member 122 to be rotated to assume a different position relative to that shown in FIG. 7A and/or for transitioning the receptacle 120 between a left-handed mounting arrangement and a right-handed mounting arrangement.

In some embodiments and implementations, the module utilized in combination with the receptacle 120 may include a non-terminal protrusion which can be received within the opening defined by the first body member 122 which does not align with an opening defined by the second body member 124 to further ensure the module remains in place within the cavity 121a once inserted therein. Further, alternative embodiments in which (i) the second body member 124 includes an additional opening positioned adjacent to opening 124c and between openings 124d and 124e, and (ii) the electrical contact of the receptacle 120 having terminal 131c includes an additional terminal which corresponds to the additional opening of the second body member 124 to accommodate modules which include six terminals are also contemplated herein.

Figure 18:
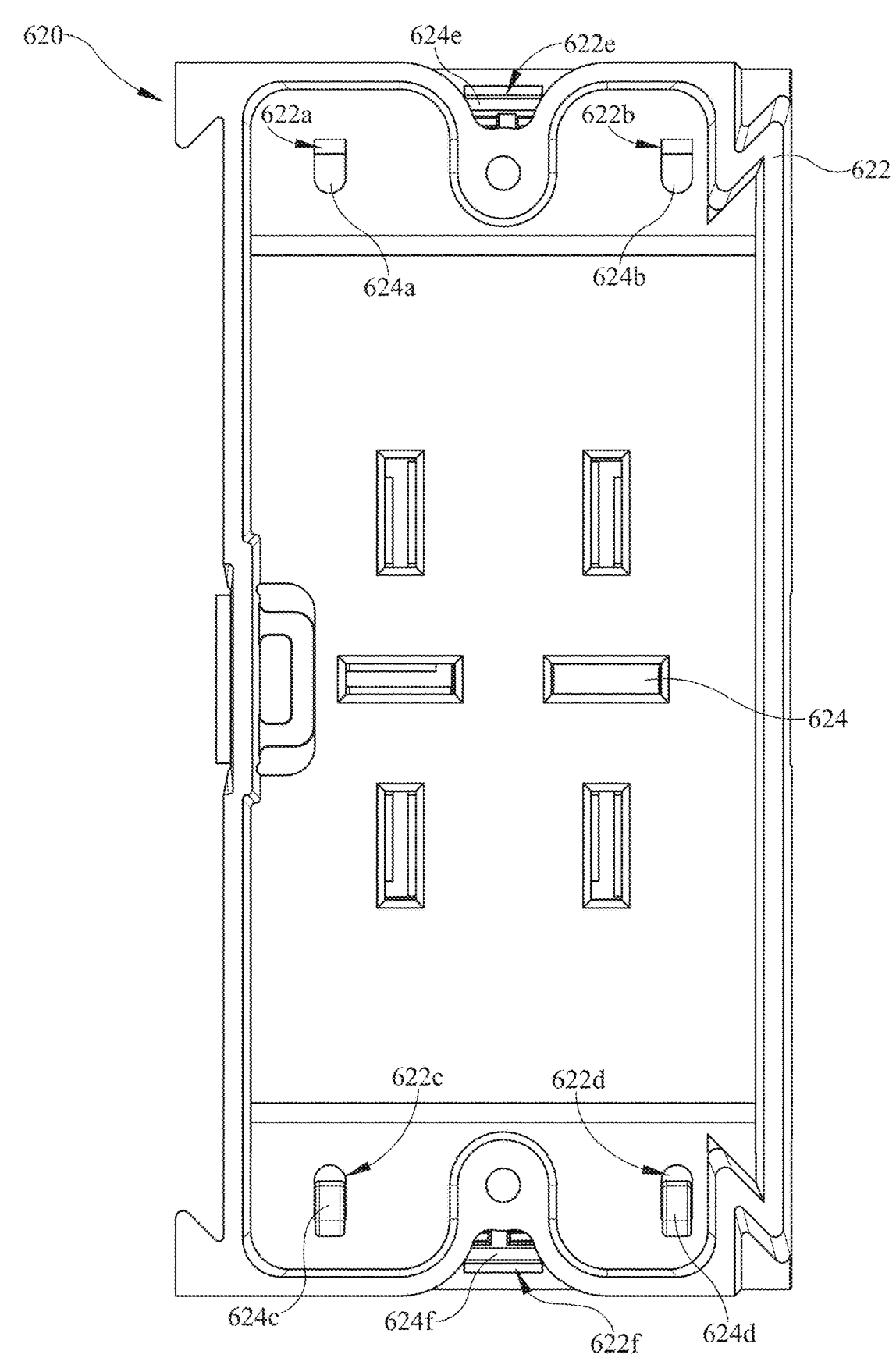
FIG. 18 is a front view of another exemplary receptacle made in accordance with the present disclosure.

FIG. 18 shows another exemplary receptacle 620 which may be utilized in the assembly 10 in place of the receptacles 20, 120 described above with reference to FIGS. 1-5, 7A, and 7B. The receptacle 620 in this exemplary embodiment is of the same construction and functions in the same manner as the receptacle 120 described above with reference to FIGS. 7A and 7B, except that first body member 622 and the second body member 624 are removably secured to each other in a different manner than that of the receptacle 120 described above with reference to FIGS. 7A and 7B. In this regard, and in this exemplary embodiment, the first body member 622 defining the cavity 62 and the second body member 624 are removably secured to each other via a snap-fit connection. In this exemplary embodiment, the second body member 624 defines a pair of oppositely positioned flexible locking tabs 624e, 624f, where each flexible locking tab 624e, 624f is biased towards a first position and is configured for insertion into a pair of corresponding slots 622e, 622f defined by the first body member 622.

Referring still to FIG. 18, to reorient the first body member 622 and the second body member 624 in similar fashion as that described above for the receptacle 120 described above with reference to FIGS. 7A and 7B, in this exemplary embodiment, each locking tab 624e, 624f is depressed to a second position to permit removal of the locking tab 624e, 624f from the slot of the 622e, 622f in which it is inserted and the first body member 622 and the second body member 624 to be separated from each other. Once the first body member 622 and the second body member 624 are separated from each other, either the first body member 622 or the second body member 624 can then be rotated 180°. The first body member 622 and the second body member 624 can then be resecured to each other by inserting each locking tab 624e, 624f into the opposite slot 622e, 622f from which it was initially inserted, whereby the bias of the locking tabs 624e, 624f toward the first position maintains the first body member 622 and the second body member 624 in association with each other. Of course, in alternative embodiments, the locking tabs facilitating the snap-fit connection may be defined by the first body member 622 and the slots facilitating the snap-fit connection may be defined by the second body member 624. Further, alternative embodiments in which only a single slot is utilized to provide the snap-fit connection are also contemplated herein. In this exemplary embodiment, to assist with alignment, and to help further maintain the first body member 622 and the second body member 624 in association with each other, a rear panel of the first body member defines a plurality of openings 622a, 622b, 622c, 622d configured to receive a plurality of corresponding hooks 624a, 624b, 624c, 624d defined by the second body member 624. Of course, in alternative embodiments, such openings may be defined by the second body member 624 and such hooks may be defined by the first body member 622.

Figure 8:
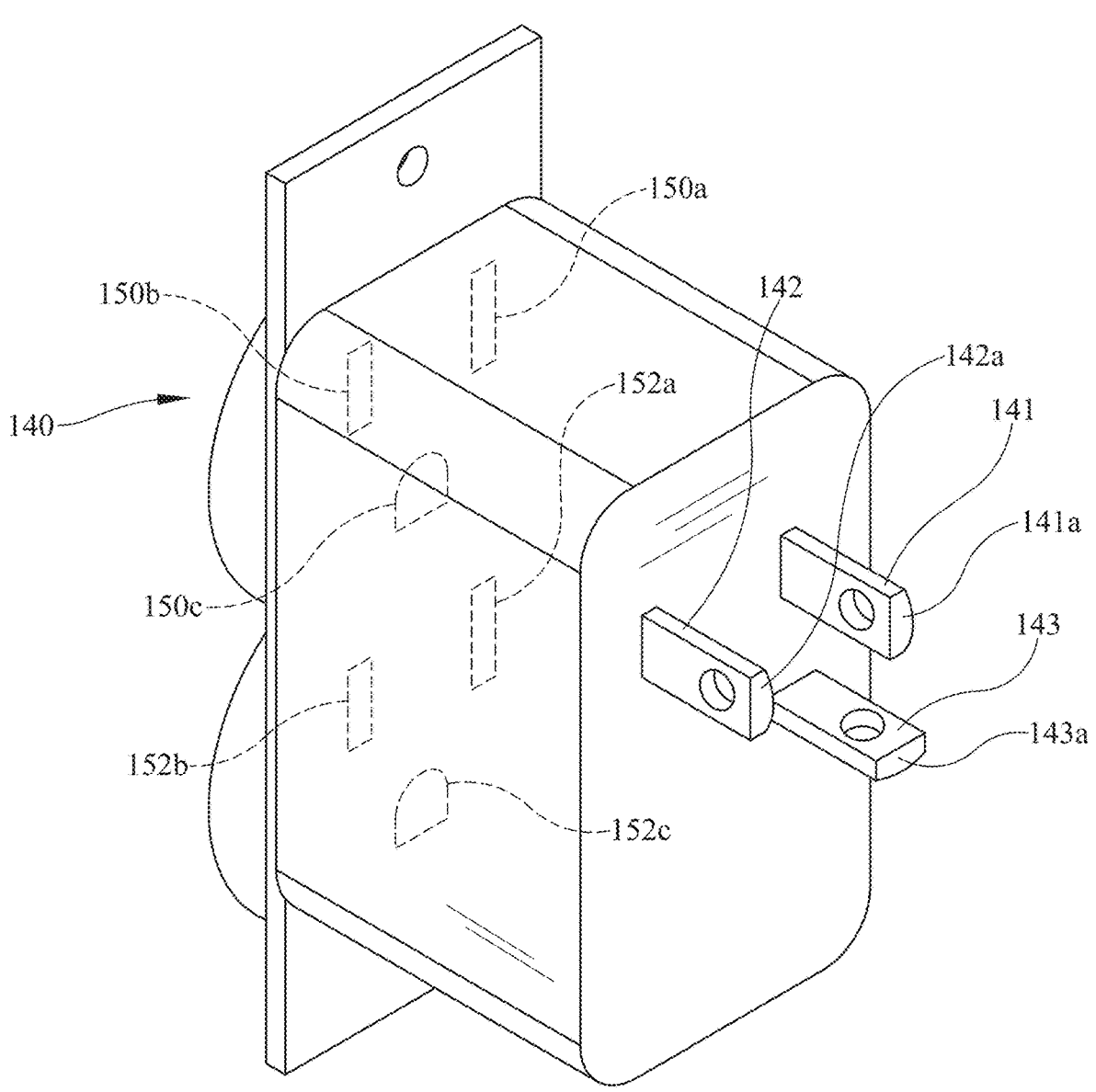
FIG. 8 is a partial perspective view of another exemplary module made in accordance with the present disclosure.

FIG. 8 shows another exemplary module 140 which may be utilized in the assembly 10 in place of the module 40 described above with reference to FIGS. 1, 2, and 6. Unlike the module 40 described above with reference to FIGS. 1, 2, and 6, in this exemplary embodiment, the module 140 is in the form of an electrical outlet instead of a switch. More specifically, in this exemplary embodiment, the module 340 is in the form of a 15-amp, 120-volt tamper-resistant electrical outlet. In this regard, the module 140 includes a first set of openings 150a, 150b, 150c, a second set of openings 152a, 152b, 152c, an internal circuitry (not shown), and a plurality of electrical contacts 141, 142, 143. The first set of openings 150a, 150b, 150c and the second set of openings 152a, 152b, 152c are configured to receive the terminals of a plug (not shown) of an electrical device (not shown) and provide access to the internal circuitry (not shown) of the module 140. Upon being inserted into the first set of openings 150a, 150b, 150c or the second set of openings 152a, 152b, 152c, each terminal of the plug is placed into electrical connection with one of the electrical contacts 141, 142, 143 via the internal circuitry of the module 140. Accordingly, when the terminals 141a, 142a, 143a of the module 140 are inserted into one of the receptacles described herein, and the receptacle is electrically connected to the circuitry 50 of a building, the terminals of the plug of the electrical device inserted in the first set of openings 150a, 150b, 150c or the second set of openings 152a, 152b, 152c can complete a circuit that permits a flow of electricity from the circuitry 50 to travel through the electrical device and back to the receptacle. Depending on the manner in which the receptacle 20, 120 is wired, the flow of electricity returned from the electrical device may be subsequently transmitted by the receptacle 20, 120, 620 back to the circuitry 50 of the building or to another receptacle of like construction.

Referring still to FIG. 8, in this exemplary embodiment, the module 140 includes three electrical contacts 141, 142, 143. Accordingly, when the module 340 is in use, a first electrical contact of the electrical contacts 141, 142, 143 can serve as a hot contact to receive a flow of electricity from a receptacle 20, 120, 620 in which the module is inserted; a second electrical contact of the electrical contacts 141, 142, 143 can serve as a neutral contact; and a third electrical contact of the electrical contacts 141, 142, 143 can serve as a ground. As reflected, for example, by comparing FIGS. 6 and 8, the positioning terminals of the electrical contacts of the modules disclosed herein can vary while still permitting use with the various receptacles disclosed herein. Furthermore, and as will become further evident in the discussion that follows, the number of electrical contacts present in a module can vary while still permitting use with the various receptacles disclosed herein.

Figure 9:
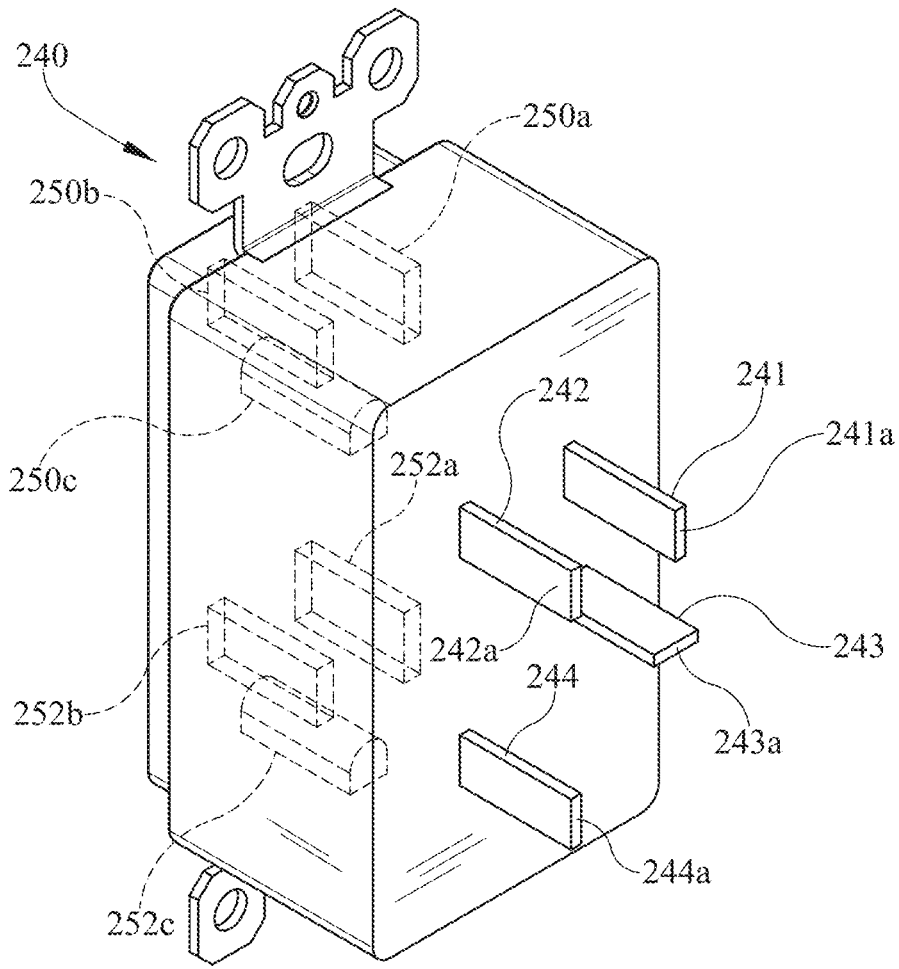
FIG. 9 is a perspective view of another exemplary module made in accordance with the present disclosure.

FIG. 9 shows another exemplary module 240 which may be utilized in the assembly 10 in place of the module 40 described above with reference to FIGS. 1, 2, and 6. Like the module 140 described above with reference to FIG. 8, in this exemplary embodiment, the module 240 is also in the form of an electrical outlet instead of a switch. However, in this exemplary embodiment, the module 240 is in the form of a 15-amp, 120-volt ground fault circuit interrupter (GFCI) electrical outlet. The module 240 includes a first set of openings 250a, 250b, 250c, a second set of openings 252a, 252b, 252c, and internal circuitry (not shown), and a plurality of electrical contacts 241, 242, 243, 244. The first set of openings 250a, 250b, 250c and the second set of openings 252a, 252b, 252c are configured to receive the terminals of a plug (not shown) of an electrical device (not shown) and provide access to the internal circuitry of the module 240. Upon being inserted into the first set of openings 250a, 250b, 250c or the second set of openings 252a, 252b, 252c, each terminal of the plug is placed into electrical connection with one of the electrical contacts 241, 242, 243, 244 via the internal circuitry of the module 240. Accordingly, when the terminals 241a, 242a, 243a, 244a of the module 240 are inserted into one of the receptacles described herein, and the receptacle is electrically connected to the circuitry 50 of a building, the terminals of the plug of the electrical device inserted in the first set of openings 250a, 250b, 250c or the second set of openings 252a, 252b, 252c can complete a circuit that permits a flow of electricity from the circuitry 50 to travel through the electrical device and back to the receptacle 20, 120. Depending on the manner in which the receptacle is wired, the flow of electricity returned from the electrical device may be subsequently transmitted by the receptacle back to the circuitry 50 of the building or another receptacle of like construction.

Referring still to FIG. 9, in this exemplary embodiment, the module 240 includes four electrical contacts 241, 242, 243, 244. Accordingly, when the module 240 is in use, a first electrical contact of the electrical contacts 241, 242, 243, 244 can serve as a hot contact to receive a flow of electricity from a receptacle 20, 120 in which the module is inserted; a second electrical contact of the electrical contacts 241, 242, 243, 244 can serve as a neutral contact; a third electrical contact of the electrical contacts 241, 242, 243, 244 can serve as a ground; and a fourth electrical contact of the electrical contacts 241, 242, 243, 244 can serve as an output, which may be useful in instances in which the module 240 is electrically connected to circuitry (via a receptacle 20, 120, 620) including a two-way switch or to other outlets providing GFCI protection.

Figure 10:
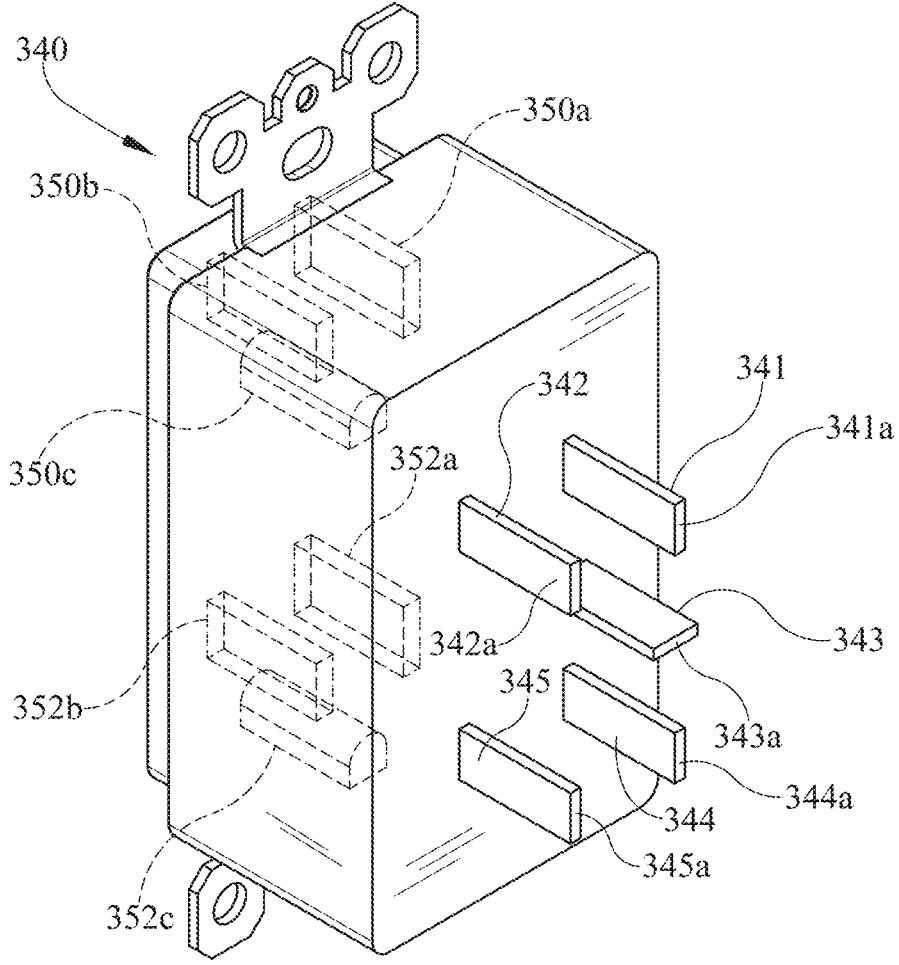
FIG. 10 is a perspective view of another exemplary module made in accordance with the present disclosure.

FIG. 10 shows another exemplary module 340 which may be utilized in the assembly 10 in place of the modules 40, 140, 240 described above with reference to FIGS. 1, 2, 6, 8, and 9. Like the module 240 described above with reference to FIG. 9, in this exemplary embodiment, the module 350 is also in the form of a 15-amp, 120-volt ground fault circuit interrupter (GFCI) electrical outlet. The module 340 includes a first set of openings 350a, 350b, 350c, a second set of openings 352a, 352b, 352c, an internal circuitry (not shown), and a plurality of electrical contacts 341, 342, 343, 344, 345. The first set of openings 350a, 350b, 350c and the second set of openings 352a, 352b, 352c are configured to receive the terminals of a plug (not shown) of an electrical device (not shown) and provide access to the internal circuitry of the module 340. Upon being inserted into the first set of openings 350a, 350b, 350c or the second set of openings 352a, 352b, 352c, each terminal of the plug is placed into electrical connection with one of the electrical contacts 341, 342, 343, 344, 345 via the internal circuitry of the module 340. Accordingly, when the terminals 341a, 342a, 343a, 344a, 345a of the module 340 are inserted into one of the receptacles described herein, and the receptacle electrically connected to the circuitry 50 of a building, the terminals of the plug of the electrical device inserted in the first set of openings 350a, 350b, 350c or the second set of openings 352a, 352b, 352c can complete a circuit that permits a flow of electricity from the circuitry 50 to travel through the electrical device and back to the receptacle. Depending on the manner in which the receptacle is wired, the flow of electricity returned from the electrical device may be subsequently transmitted by the receptacle back to the circuitry 50 of the building or to another receptacle of like construction.

Referring still to FIG. 10, in this exemplary embodiment, the module 340 includes five electrical contacts 341, 342, 343, 344, 345. Accordingly, when the module 340 is in use, a first electrical contact of the electrical contacts 341, 342, 343, 344, 345 can serve as a hot contact to receive a flow of electricity from a receptacle 20, 120 in which the module is inserted; a second electrical contact of the electrical contacts 341, 342, 343, 344, 345 can serve as a neutral contact; a third electrical contact of the electrical contacts 341, 342, 343, 344, 345 can serve as a ground; and a fourth and fifth electrical contact of the electrical contacts 341, 342, 343, 344, 345 can serve as a first output and second output, which may be useful in instances in which the module 340 is electrically connected to circuitry (via a receptacle 20, 120) including a three-way switch.

Although the modules 140, 240, 340 described above with reference to FIGS. 8-10 are generally identified as including at least three electrical contacts, it should be appreciated that embodiments in which an outlet-type module of the assembly 10 includes only two electrical contacts to facilitate the transmission of a flow of electricity to one or more electrical devices plugged into the outlet-type module and subsequent return of the flow of electricity to the receptacle in which the outlet-type module is inserted are also contemplated herein. Furthermore, it should be appreciated that while the modules 140, 240, 340 described above with reference to FIGS. 8-10 are generally identified and illustrated as being configured to receive typical two-pronged or three-pronged plugs, such modules 140, 240, 340 are not necessarily limited to such construction. Rather, in alternative embodiments, such modules 140, 240, 340 may be configured to additionally or alternatively receive a universal serial bus (USB) connector or other types of connectors for electrically connecting a device to the internal circuitry of the module 140, 240, 340.

Figure 16:
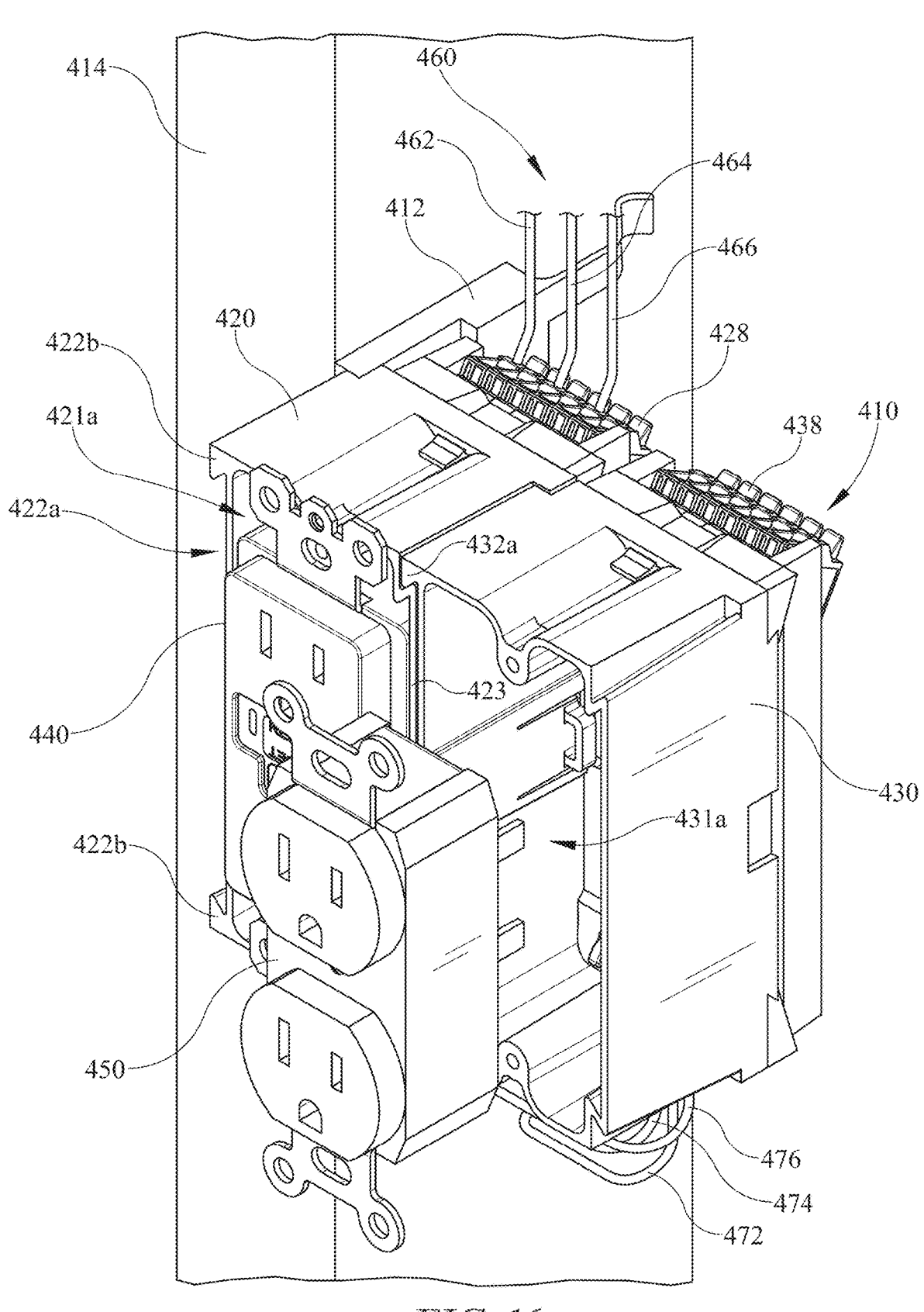
FIG. 16 is a perspective view of another exemplary assembly made in accordance with the present disclosure.

FIG. 16 shows another exemplary assembly 410 made in accordance with the present disclosure. As shown, in this exemplary embodiment, the assembly 410 includes: a first receptacle 420; a first module 440; a second receptacle 430 attached to the first receptacle 420; and a second module 450. As shown, the first module 440 is configured to be removably inserted into a cavity 421a of the first receptacle 420 to place the first module 440 in electrical connection with the first receptacle 420. Similarly, the second module 450 is configured to be removably inserted into a cavity 431a of the second receptacle 430 to place the second module 450 in electrical connection with the second receptacle 430. In this exemplary embodiment, the first receptacle 420 and the second receptacle 430 are of the same construction and function in the same manner as the receptacle 120 described above with reference to FIGS. 7A and 7B, and the first module 440 and the second module 450 are of the same construction and function in the same manner as the modules 240, 140 described above with reference to FIGS. 9 and 8, respectively. The exemplary assembly 410 is considered to be fully assembled when the first receptacle 420 and the second receptacle 430 are attached to each other in the manner described below, and the first module 440 and the second module 450 are inserted into the cavity, and placed into electrical connection with, the first receptacle 420 and the second receptacle 430, respectively. In some embodiments, the assembly 410 may further include a mounting plate 412 and two or more wires 472, 474, 476 that electrically connect the first receptacle 420 and the second receptacle 430, as further described below.

Figure 11:
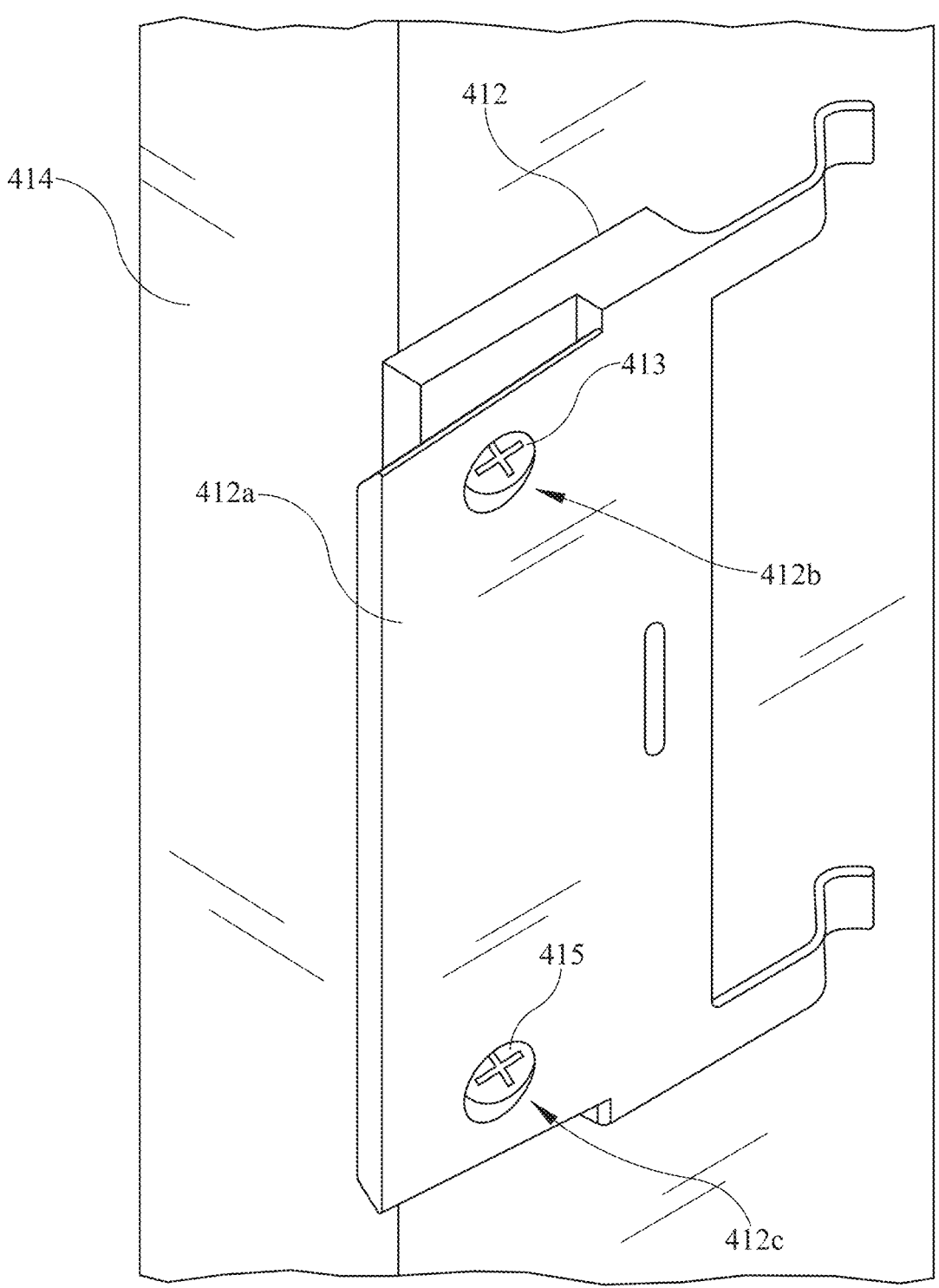
FIG. 11 is a perspective view of a mounting plate made in accordance with the present disclosure mounted to a structure of the building.

FIGS. 11, 12A-12C, and 13-16, in sequence, illustrate an exemplary method for installing the exemplary assembly 410 shown in FIG. 16. As shown in FIG. 11, in this exemplary implementation, a mounting plate 412 is first secured to a structure 414 of a building, such as a stud of the framework of the building via one or more fasteners 413, 415. The mounting plate 412 shown in FIG. 11 is of the same construction and functions in the same manner as the mounting plate 12 described above with reference to FIG. 1. In this regard, the mounting plate 412 includes a male member 412a that is configured for insertion into the slot 422a defined by the first protuberance 422b and the second protuberance 422c of the first receptacle 420, and one or more openings 412b, 412c in which the one or more fasteners 413, 415 can be inserted to secure the mounting plate 412 to the structure 414 of the building. After securing the mounting plate 412 to the structure 414, in this exemplary implementation, the first receptacle 420 and the second receptacle 430 are attached to one another. As shown by viewing FIGS. 12A-12C in sequence, in this exemplary embodiment and implementation, the first receptacle 420 and the second receptacle 430 are attached to one another by aligning and subsequently inserting the male connector of the first receptacle 420 collectively defined by the second side panel 423, the first indentation 424a, and the second indentation 425a into the slot 432a forming the female connector and defined by the first protuberance 432b and the second protuberance 432c of the second receptacle 430 until a front face of the first receptacle 420 and a front face of the second receptacle 430 reside along a common plane.

Referring now specifically to FIGS. 11 and 13-16, once the first receptacle 420 and the second receptacle 430 are attached, in this exemplary implementation, the first receptacle 420 and the second receptacle 430 are placed in electrical connection with each other via wiring 472, 474, 476, such that the first receptacle 420 can transmit a flow of electricity to the second receptacle 430 and the second receptacle 430 can subsequently return the received flow of electricity back to the first receptacle 420. In this regard, each respective wire 472, 474, 476 is placed into contact with one of the interface terminals (not shown) of the first receptacle 420 and one of the interface terminals (not shown) of the second receptacle 430 utilizing one of the terminal connectors 428, 429, 438, 439 of the first receptacle 420 and the second receptacle 430. In this exemplary implementation, the second terminal connector 429 of the first receptacle 420 and the second terminal connector 439 of the second receptacle 430 are utilized to maintain the respective wires 472, 474, 476 in connection with the first receptacle 420 and the second receptacle 430. In some implementations, the first receptacle 420 and the second receptacle 430 may additionally or alternatively be placed in electrical connection with each other via wiring maintained between the first terminal connector 428 of the first receptacle 420 and the first terminal connector 438 of the second receptacle 430. It should thus be appreciated that that the specific wiring arrangements illustrated in the drawings are for purposes of explanation and not limitation, and that one of ordinary skill in the art would readily appreciate and recognize additional or alternative wiring arrangements needed for a particular application.

Figure 14:
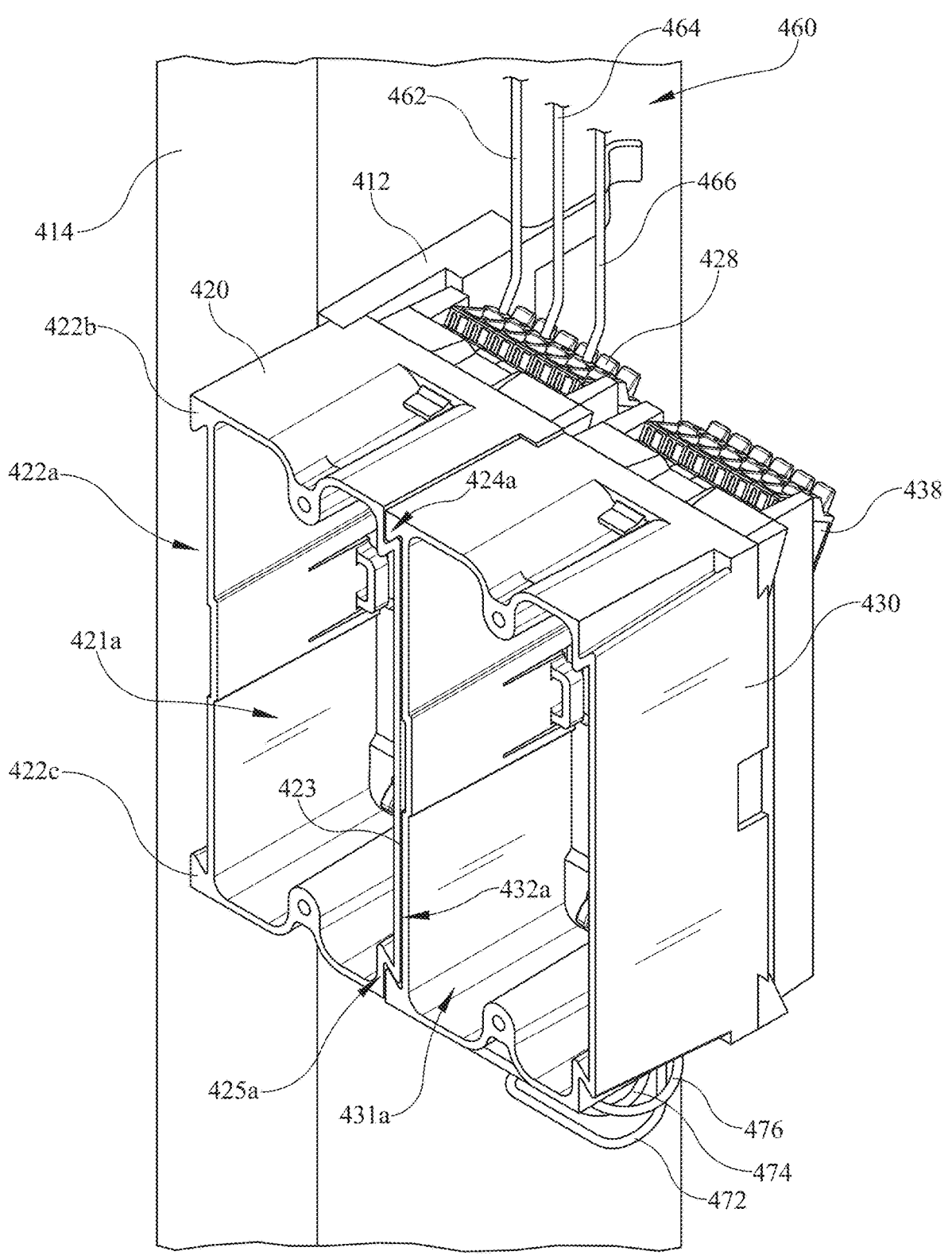
FIG. 14 is another perspective view of the first exemplary receptacle and the second exemplary receptacle of FIG. 13, but with the first exemplary receptacle partially mounted to the mounting plate of FIG. 11 and a second set of wiring electrically connected to the first exemplary receptacle.
Figure 15:
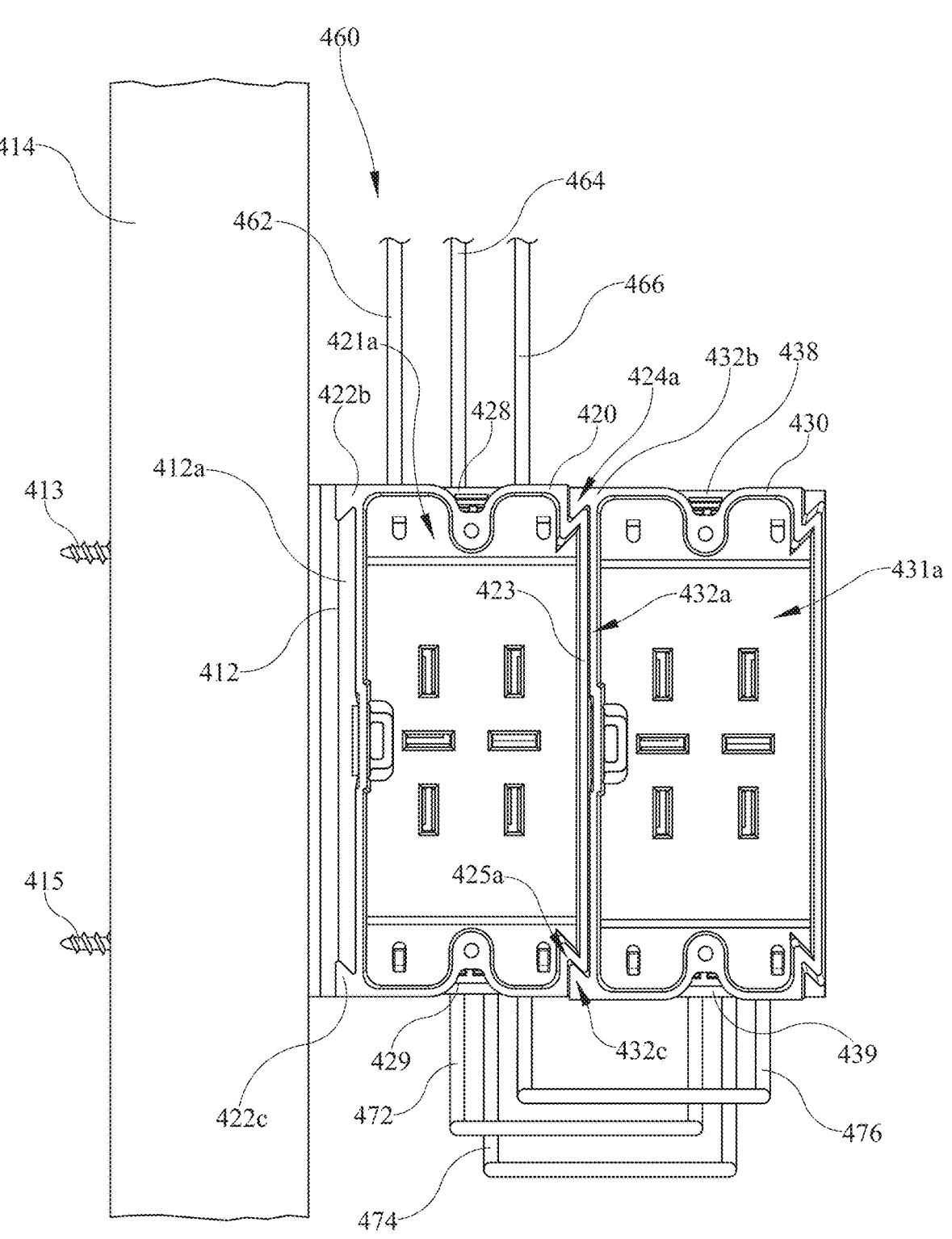
FIG. 15 is a front view of the first exemplary receptacle and the second exemplary receptacle of FIG. 14.

Referring now to FIGS. 14-16, after the first receptacle 420 and the second receptacle 430 are placed into electrical contact with one another, in this exemplary implementation, the attached first receptacle 420 and the second receptacle 430 are mounted to the mounting plate 412 by aligning and inserting the male member 412a of the mounting plate 412 into the slot 422a of the first receptacle 420 until the first receptacle 420 and the second receptacle 430 are supported by the mounting plate 412. Once the first receptacle 420 and the second receptacle 430 are mounted to the mounting plate 412, the first receptacle 420 is, in this exemplary implementation, wired to the circuitry 460 of the building via wiring 462, 464, 466. In this regard, each respective wire 460, 462, 464 of the circuitry is placed into contact with one of the interface terminals of the first receptacle 420 utilizing one of the terminal connectors 428, 429 of the first receptacle 420. In this exemplary implementation, the first terminal connector 428 is utilized to place and maintain the wiring 462, 464, 466 of the circuitry 460 of the building in contact with select interface terminals of the first receptacle 420. Prior to the wiring 462, 464, 466 of the circuitry 460 being connected to the first receptacle 420, the power to the circuitry 60 will typically be turned off (e.g., by turning off the circuit or circuit breaker corresponding to the circuitry 460) to reduce the risk of shock.

Referring now again specifically to FIG. 16, once the first receptacle 420 is wired to the circuitry 460 of the building, the first module 440 and the second module 450 are, in this exemplary implementation, inserted into the cavity 421a of the first receptacle 420 and the cavity 431a of the second receptacle 430 to place the first module 440 and the second module 450 in electrical connection with the first receptacle 420 and the second receptacle 430, respectively. Prior to placing the first module 440 and the second module 450 into electrical connection of the first receptacle 420 and the second receptacle 430, respectively, the power to the circuitry 460 can be turned on as the electrical contacts and/or internal circuitry of the first receptacle 420, the second receptacle 430, the first module 440, and the second module 450 do not have to be engaged by a user to insert the first module 440 and the second module 450 into the cavity 421a, 431a of the first receptacle 420 and the second receptacle 430. Of course, alternatively, the first module 440 and the second module 450 can be inserted into the first receptacle 420 and the second receptacle 430 prior to the power to the circuitry 460 of the building being turned back on.

Although the various steps of the exemplary method for installing the exemplary assembly 410 are described above as occurring in a specific order, it should be appreciated that such steps can occur in any order without departing from the spirit and scope of the present disclosure, except where context precludes otherwise. For instance, in alternative implementations, the assembly 410 may be assembled prior to the mounting plate 412 being secured to the structure 414, the first receptacle 420 being wired to the second receptacle 430, the first receptacle 420 being secured to the mounting plate 412, and/or the first receptacle 420 being wired to the circuitry 460 of the building. In some alternative implementations, the first module 440 and/or the second module 450 may be inserted into the first receptacle 420 and the second receptacle 430, respectively, prior to the first receptacle 420 and the second receptacle 430 being attached to each other. Furthermore, it should be appreciated that while the first module 440 and the second module 450 are primarily described herein as being of the same construction as the module 240 described above with reference to FIG. 9 and the module 140 described above with reference to FIG. 8, respectively, that the first module 440 and/or the second module 450 can, in alternative embodiments, be any of the modules 40, 140, 240, 340 described herein without departing from the spirit and scope of the present disclosure. Likewise, while the first receptacle 420 and the second receptacle 430 are primarily described herein as being of the same construction as the receptacle 120 described above with reference to FIGS. 7A and 7B, that the first receptacle 420 and/or the second receptacle 430 can, in alternative embodiments, be any of the receptacles disclosed herein without departing from the spirit and scope of the present disclosure.

Figure 17:
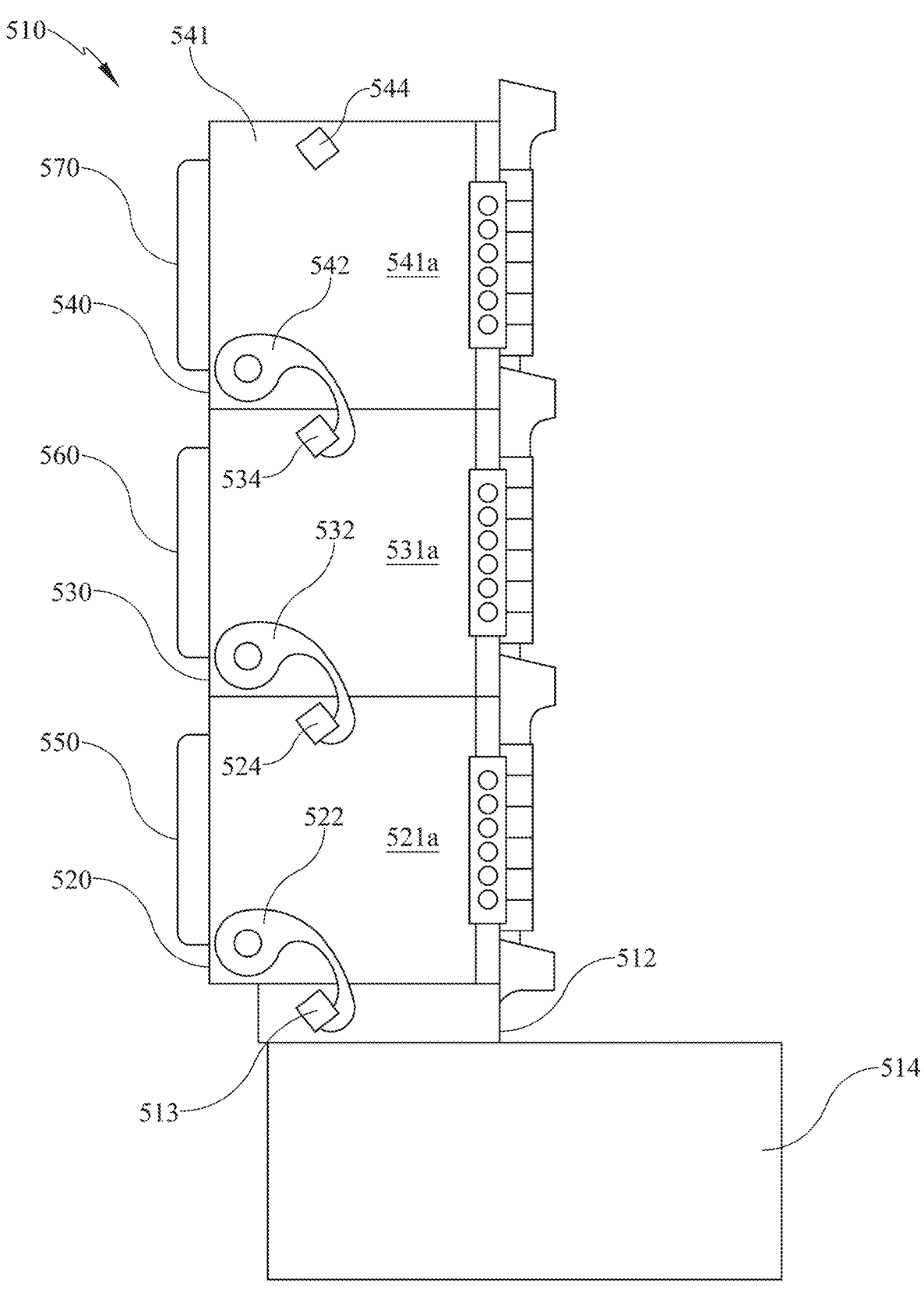
FIG. 17 is a top schematic view of another exemplary assembly made in accordance with the present disclosure.

FIG. 17 shows another exemplary assembly 510 made in accordance with the present disclosure. As shown, in this exemplary embodiment, the assembly 510 includes three receptacles 520, 530, 540 and three modules 550, 560, 570 removably inserted in, and in electrical connection with, the three receptacles 520, 530, 540. The three receptacles are attached to each other in the same manner as the receptacles 420, 430 of the assembly 410 described above with reference to FIG. 16 (i.e., via the male and female connectors of adjacently positioned receptacles 520, 530, 540). In this exemplary embodiment, each of the three receptacles 520, 530, 540 is of the same construction and function in the same manner as the receptacle 120 described above with reference to FIGS. 7A and 7B, except that each receptacle 520, 530, 540 includes a rotating latch 522, 532, 542 and a catch 524, 534, 544 provided on an upper surface 521a, 531a, 541a defined by the an upper panel 521, 531, 541 of the receptacle 520, 530, 540.

Referring still to FIG. 17, as shown, the rotating latch 522, 532, 542 and the catch 524, 534, 544 of each receptacle 520, 530, 540 are provided on opposite sides of the top surface 521a, 531a, 541a so that the rotating latch 522, 532, 542 of one receptacle 520, 530, 540 can be rotated to engage the catch 524, 534, 544 of another, adjacently positioned receptacle 520, 530, 540 to further ensure the two receptacles do not inadvertently detach from each other while the assembly 510 is in use. As shown, as with the assembly 410 described above with reference to FIG. 16, the assembly 510 in this exemplary embodiment can also be secured to a structure 514 of a building via a mounting plate 512 in the same manner as described above with reference to FIGS. 14-16. In this regard, the mounting plate 512 shown in FIG. 17 is of the same construction and functions in the same manner as the mounting plate 412 described above with reference to FIGS. 11 and 14-16, except that the mounting plate 512 includes a catch 513 provided on an upper surface of the mounting plate 512. The rotating latch 522 of the receptacle 520 directly secured to the mounting plate 512 can be rotated to engage the catch 513 to further ensure the assembly 510 does not inadvertently detach from the mounting plate 512 when in use. One of the receptacles 520, 530, 540 within the assembly 510 can be wired to the circuitry (not shown) of a building in the same manner as described above. The respective receptacles 520, 530, 540 of the assembly can be electrically connected to each other via wiring (not shown) so that a flow of electricity from one receptacle 520, 530, 540 can be transmitted to another receptacle 520, 530, 540 in the assembly 510.

As with the assembly 10 described above with reference to FIGS. 1-5, the respective modules 440, 450, 550, 560, 570 associated with the respective receptacles 420, 430, 520, 530, 540 of the assemblies 410, 510 described above with reference to FIGS. 16 and 17 can be easily replaced with another module configured to be placed in electrical connection with the receptacle 420, 430, 520, 530, 540 via insertion into the cavity of the receptacle 420, 430, 520, 530, 540. In this regard replacement of a module can be effectuated by first removing a module 440, 450, 550, 560, 570 from the cavity of the receptacle 420, 430, 520, 530, 540 in which it is inserted, thereby disconnecting the module 440, 450, 550, 560, 570 from electrical connection with the receptacle 420, 430, 520, 530, 540. Once the module 440, 450, 550, 560, 570 initially inserted in the receptacle 420, 430, 520, 530, 540 is removed, another module can be placed in electrical connection with the receptacle 420, 430, 520, 530, 540 by inserting such module into the cavity of the receptacle 420, 430, 520, 530, 540 until the electrical contacts of the module are in contact with corresponding electrical contacts of the receptacle 420, 430, 520, 530, 540. As the electrical pathways which may be provided with a flow of electricity will typically either be broken or not accessible to a user during such removal and insertion process, the modules of the assemblies 510 can be readily replaced as desired without having to turn off the power to any circuitry with which such assemblies 410, 510 are electrically connected.

One of ordinary skill in the art will recognize that additional embodiments and implementations are also possible without departing from the teachings of the present disclosure. This detailed description, and particularly the specific details of the exemplary embodiments and implementations disclosed herein, are given primarily for clarity of understanding, and no unnecessary limitations are to be understood therefrom, for modifications will become obvious to those skilled in the art upon reading this disclosure and may be made without departing from the spirit or scope of the disclosure.

What is claimed is:

1. A receptacle for electrically connecting a circuitry of a building to a module for transmitting and/or regulating a flow of electricity, the receptacle comprising:
   a body defining a cavity for receiving the module;
   a first electrical contact secured to a rear surface of the body, the first electrical contact including
      a first terminal configured to place the receptacle in electrical connection with a first terminal of the module, and
      a second terminal configured to place the receptacle in electrical connection with the circuitry of the building; and
   a second electrical contact secured to the rear surface of the body, the second electrical contact including
      a first terminal configured to place the receptacle in electrical connection with a second terminal of the module, and a second terminal configured to place the receptacle in electrical connection with the circuitry of the building;
   wherein the body includes a rear panel that defines the rear surface, a first opening, and a second opening;
   wherein the first opening provides access to the first terminal of the first electrical contact; and
   wherein the second opening provides access to the first terminal of the second electrical contact.

2. The receptacle as recited in claim 1, and further comprising:
   a third electrical contact secured to the rear surface of the body, the third electrical contact including
      a first terminal configured to place the receptacle in electrical connection with a third terminal of the module, and
      a second terminal configured to place the receptacle in electrical connection with the circuitry of the building;
   wherein the rear panel defines a third opening providing access to the first terminal of the third electrical contact.

3. The receptacle as recited in claim 2, and further comprising:
   a fourth electrical contact secured to the rear surface of the body, the fourth electrical contact including
      a first terminal configured to place the receptacle in electrical connection with a fourth terminal of the module, and
      a second terminal; and
   a fifth electrical contact secured to the rear surface of the body, the fifth electrical contact including
      a first terminal configured to place the receptacle in electrical connection with a fifth terminal of the module, and
      a second terminal;
   wherein the rear panel defines a fourth opening providing access to the first terminal of the fourth electrical contact; and
   wherein the rear panel defines a fifth opening providing access to the first terminal of the fifth electrical contact.

4. The receptacle as recited in claim 1, and further comprising:
   one or more terminal connectors secured to the rear surface of the body, with each terminal connector of the one or more terminal connectors configured to maintain the second terminal of at least one of the first electrical contact and the second electrical contact in electrical connection with the circuitry of the building.

5. The receptacle as recited in claim 4, wherein each terminal connector of the one or more terminal connectors is a lever nut.

6. The receptacle as recited in claim 1, wherein the receptacle includes
   a first male connector on a first side of the body, and
   a first female connector on a second side the body that is opposite of the first side;
   wherein the first male connector is sized for insertion into a second female connector of the same dimension as the first female connector; and
   wherein the first female connector is sized to receive a second male connector of the same dimension as the first male connector.

7. The receptacle as recited in claim 6, wherein the first male connector and the first female connector are each defined by the body.

8. The receptacle as recited in claim 1, wherein the first terminal of the first electrical contact defines a slot configured to receive the first terminal of the module, and wherein the first terminal of the second electrical contact defines a slot configured to receive the second terminal of the module.

9. The receptacle as recited in claim 1, wherein the body includes a first body member that defines the cavity; and a second body member removably secured to the first body member;

wherein the first electrical contact and the second electrical contact are secured to a rear surface of the second body member; and wherein the first opening and the second opening are each defined by one opening defined by the first body member and another opening defined by the second body member that is aligned with the one opening defined by the first body member.

10. An assembly for transmitting and/or regulating a flow of electricity received from a circuitry of a building, comprising:

a first receptacle defining a cavity, the first receptacle configured to receive and transmit the flow of electricity from the circuitry of the building; and a module removably inserted in the cavity of the first receptacle, the module configured to transmit and/or regulate the flow of electricity received from the first receptacle;

wherein the module includes a first terminal, a second terminal, and an internal circuitry that is electrically connected to the first terminal and the second terminal;

wherein the first receptacle includes a first electrical contact, the first electrical contact including (a) a first terminal configured to place the first receptacle in electrical connection with the first terminal of the module, and (b) a second terminal configured to place the first receptacle in electrical connection with the circuitry of the building, and a second electrical contact, the second electrical contact including (a) a first terminal configured to place the first receptacle in electrical connection with the second terminal of the module, and (b) a second terminal configured to place the first receptacle in electrical connection with the circuitry of the building;

wherein the first electrical contact of the first receptacle and the second electrical contact of the first receptacle are secured to a body of the first receptacle that defines the cavity, a first opening, and a second opening;

wherein the first opening provides access to the first terminal of the first electrical contact of the first receptacle; and wherein the second opening provides access to the first terminal of the second electrical contact of the first receptacle.

11. The assembly as recited in claim 10, wherein the first terminal of the module is configured to be inserted into the first opening defined by the body of the first receptacle; and wherein the second terminal of the module is configured to be inserted into the second opening defined by the body of the first receptacle.

12. The assembly as recited in claim 11, wherein the first terminal of the first electrical contact of the first receptacle defines a first slot for receiving the first terminal of the module; and wherein the first terminal of the second electrical contact of the first receptacle defines a second slot for receiving the second terminal of the module.

13. The assembly as recited in claim 10, and further comprising:

a second receptacle attached to the first receptacle, the second receptacle including a first electrical contact electrically connected to the first receptacle, and a second electrical contact electrically connected to the first receptacle.

14. The assembly as recited in claim 13, and further comprising:

an additional module removably inserted in a cavity of the second receptacle, the additional module configured to transmit and/or regulate the flow of electricity received from the second receptacle.

15. The assembly as recited in claim 13, wherein the first receptacle includes one of a male connector and a female connector, and the second receptacle includes the other of the male connector and the female connector, and wherein the second receptacle is attached to the first receptacle via mating of the male connector and the female connector.

16. The assembly as recited in claim 10, wherein the module is an electrical switch or an electrical outlet for transmitting the flow of electricity to another device electrically connected to the electrical outlet.

17. A method for replacing an electrical module for transmitting and/or regulating a flow of electricity, the method comprising steps of:

removing a first module configured to transmit and/or regulate the flow of electricity from a cavity of a receptacle that is electrically connected to a circuitry of a building, whereby removal of the first module from the cavity removes the first module from electrical connection with the receptacle; and inserting a second module configured to transmit and/or regulate the flow of electricity into the cavity to electrically connect the second module to the circuitry of the building via the receptacle; and wherein removal of the first module and insertion of the second module is performed while the receptacle is electrically connected to the circuitry of the building and the flow of electricity is supplied from the circuitry to the receptacle.

18. A method for installing an assembly for transmitting and/or regulating a flow of electricity received from a circuitry of a building, comprising steps of:

securing a mounting plate to a structure of the building;

connecting a receptacle configured to receive and transmit a flow of electricity, the receptacle including a body defining a cavity;

wiring the receptacle to the circuitry of the building; and inserting a module configured to transmit and/or regulate the flow of electricity into the cavity defined by the body of the receptacle, such that the module and the receptacle are placed in electrical connection with each other;

wherein the module includes a first terminal, a second terminal, and an internal circuitry that is electrically connected to the first terminal and the second terminal;

wherein the receptacle includes a first electrical contact, the first electrical contact including (a) a first terminal configured to place the receptacle in electrical connection with the first terminal of the module, and (b) a second terminal configured to place the receptacle in electrical connection with the circuitry of the building, and a second electrical contact, the second electrical contact including (a) a first terminal configured to place the receptacle in electrical connection with the second terminal of the module, and (b) a second terminal configured to place the receptacle in electrical connection with the circuitry of the building;

wherein the first electrical contact of the receptacle and the second electrical contact of the receptacle are secured to a body of the receptacle that defines the cavity, a first opening, and a second opening;

wherein the first opening provides access to the first terminal of the electrical contact of the receptacle; and wherein the second opening provides access to the first terminal of the second electrical contact of the receptacle.

* * * * *